(12) United States Patent
Morikawa et al.

(10) Patent No.: US 6,237,084 B1
(45) Date of Patent: *May 22, 2001

(54) PROCESSOR WHICH CAN FAVORABLY EXECUTE A ROUNDING PROCESS COMPOSED OF POSITIVE CONVERSION AND SATURATED CALCULATION PROCESSING

(75) Inventors: Toru Morikawa, Katano; Nobuo Higaki, Osaka; Akira Miyoshi; Keizo Sumida, both of Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,577

(22) Filed: Sep. 20, 1999

Related U.S. Application Data

(62) Division of application No. 08/980,676, filed on Dec. 1, 1997, now Pat. No. 5,974,540.

(30) Foreign Application Priority Data

Nov. 29, 1996 (JP) .................................................... 8-320423

(51) Int. Cl.[7] .............................. G06F 9/302; G06F 7/38
(52) U.S. Cl. ........................... 712/221; 708/551; 708/552
(58) Field of Search ................................... 712/221, 222; 708/204, 205, 207, 496, 497, 498, 550, 551, 552

(56) References Cited

U.S. PATENT DOCUMENTS

| | | |
|---|---|---|
| 4,935,890 | 6/1990 | Funyu . |
| 4,945,507 | 7/1990 | Ishida et al. . |
| 5,235,533 | 8/1993 | Sweedler . |
| 5,251,166 | 10/1993 | Ishida . |
| 5,402,368 | 3/1995 | Yamada et al. . |
| 5,448,509 | 9/1995 | Lee et al. . |
| 5,504,697 | 4/1996 | Ishida . |
| 5,508,951 | 4/1996 | Ishikawa . |
| 5,696,709 | 12/1997 | Smith, Sr. . |
| 5,812,439 | 9/1998 | Hansen . |
| 5,889,980 | 3/1999 | Smith, Sr. . |
| 5,917,740 | * 6/1999 | Volkonsky ............................ 708/552 |
| 5,974,540 | * 10/1999 | Morikawa et al. ................... 712/221 |
| 6,029,184 | * 2/2000 | He ........................................ 702/490 |
| 6,058,410 | * 5/2000 | Sharangpani ......................... 708/551 |

FOREIGN PATENT DOCUMENTS

| | | |
|---|---|---|
| 657804 | 6/1995 | (EP) . |
| 2300054 | 10/1996 | (GB) . |
| 58-56032 | 4/1983 | (JP) . |
| 7210368 | 8/1995 | (JP) . |
| 9617292 | 6/1996 | (WO) . |

OTHER PUBLICATIONS

"Low–Power Multimedia RISC," by K. Nadehara, 8207 IEEE Micro 15 (1995) Dec., No. 6.

"Subword Parallelism with MAX–2," by R. Lee, IEEE Micro Aug. 1, 1996, vol. 16, No. 4.

* cited by examiner

*Primary Examiner*—Richard L. Ellis
(74) *Attorney, Agent, or Firm*—Price And Gess

(57) ABSTRACT

A processor which executes positive conversion processing, which converts coded data into uncoded data, and saturation calculation processing, which rounds a value to an appropriate number of bits, at high speed. When a positive conversion saturation calculation instruction "MCSST D1" is decoded, the sum-product result register 6 outputs its held value to the path P1. The comparator 22 compares the magnitude of the held value of the sum-product result register 6 with the coded 32-bit integer "0x0000_00FF". The polarity judging unit 23 judges whether the eighth bit of the value held by the sum-product result register 6 is "ON". The multiplexer 24 outputs one of the maximum value "0x0000_00FF" generated by the constant generator 21, the zero value "0x0000_0000" generated by the zero generator 25, and the held value of the sum-product result register 6 to the data bus 18.

20 Claims, 17 Drawing Sheets

FIG. 2 PRIOR ART $$\begin{pmatrix} H11,H12,H13,H14,H15,H16,H17,H18 \\ H21,H22,H23,H24,H25,H26,H27,H28 \\ H31,H32,H33,H34,H35,H36,H37,H38 \\ H41,H42,H43,H44,H45,H46,H47,H48 \\ H51,H52,H53,H54,H55,H56,H57,H58 \\ H61,H62,H63,H64,H65,H66,H67,H68 \\ H71,H72,H73,H74,H75,H76,H77,H78 \\ H81,H82,H83,H84,H85,H86,H87,H88 \end{pmatrix} = \begin{pmatrix} G11,G12,G13,G14,G15,G16,G17,G18 \\ G21,G22,G23,G24,G25,G26,G27,G28 \\ G31,G32,G33,G34,G35,G36,G37,G38 \\ G41,G42,G43,G44,G45,G46,G47,G48 \\ G51,G52,G53,G54,G55,G56,G57,G58 \\ G61,G62,G63,G64,G65,G66,G67,G68 \\ G71,G72,G73,G74,G75,G76,G77,G78 \\ G81,G82,G83,G84,G85,G86,G87,G88 \end{pmatrix} * \begin{pmatrix} F11,F12,F13,F14,F15,F16,F17,F18 \\ F21,F22,F23,F24,F25,F26,F27,F28 \\ F31,F32,F33,F34,F35,F36,F37,F38 \\ F41,F42,F43,F44,F45,F46,F47,F48 \\ F51,F52,F53,F54,F55,F56,F57,F58 \\ F61,F62,F63,F64,F65,F66,F67,F68 \\ F71,F72,F73,F74,F75,F76,F77,F78 \\ F81,F82,F83,F84,F85,F86,F87,F88 \end{pmatrix}$$

| | | | |
|---|---|---|---|
| INSTRUCTION 1: | | MOV F_ENTRY, A0 | #FIRST ADDRESS OF Fij→A0 |
| INSTRUCTION 2: | | MOV G_ENTRY, A1 | #FIRST ADDRESS OF Gji→A1 |
| INSTRUCTION 3: | | MOV H_ENTRY, A2 | #FIRST ADDRESS OF Hij→A2 |
| INSTRUCTION 4: | | MOV INIT, D2 | #LOOP INITIAL VALUE→D2 |
| | LP1_START: | | |
| INSTRUCTION 5: | | MOV (A0), D0 | #COMPRESSED DATA OF Fij→D0 |
| INSTRUCTION 6: | | MOV (A1), D1 | #COEFFICIENT DATA OF Gji→D1 |
| INSTRUCTION 7: | | MACCB D0, D1 | #MULTIPLICATION INSTRUCTION WITH SUM-PRODUCT FUNCTION |
| INSTRUCTION 8: | | CMP NUMBER, D2 | #COMPARISON OF LOOP TOTAL WITH D2 |
| INSTRUCTION 9: | | BCS LP1_NEXT | #BRANCH TO LP1_NEXT IF CARRY SET |
| INSTRUCTION 10: | | MCSST D1 | #POSITIVE CONVERSION SATURATION PROCESSING IF CARRY CLEAR |
| INSTRUCTION 11: | | MOV D1, (A2) | #D1→MATRIX MULTIPLE OF Hij |
| INSTRUCTION 12: | | BRA LP1_END | |
| | LP1_NEXT: | | |
| INSTRUCTION 13: | | INC D2 | #LOOP ITERATIONS (VALUE OF D2) INCREASED |
| INSTRUCTION 14: | | INC A0 | #ADDRESS A0 OF Fij MOVED TO NEXT COLUMN |
| INSTRUCTION 15: | | ADD ROW1, A1 | #ADDRESS A1 OF Gji MOVED TO NEXT COLUMN, ROW1:OFFSET TO NEXT SET |
| INSTRUCTION 16: | | BRA LP1_START | |
| | LP1_END: | | |

FIG. 9

| LOGIC VALUE X | LOGIC VALUE Y | SELECTED INPUT VALUE |
|---|---|---|
| 1 | 0 | 0x0000_00FF |
| 1 | 1 | 0x0000_0000 |
| 0 | 1 | 0x0000_0000 |
| 0 | 0 | STORED VALUE OF SUM-PRODUCT RESULT REGISTER |

PROCESSOR WHICH CAN FAVORABLY EXECUTE A ROUNDING PROCESS COMPOSED OF POSITIVE CONVERSION AND SATURATED CALCULATION PROCESSING

This is a divisional application of U.S. Ser. No. 08/980,676 now U.S. Pat. No. 5,974,540 filed Dec. 1, 1997.

BACKGROUND OF THE INVENTION

1. Field of the Invention

The present invention relates to a processor that performs processing according to instruction sequences that are stored in a ROM or the like.

2. Background of the Invention

In recent years, there has been a visible increase in the use of application software that can interactively reproduce various kinds of data, such as video data, still image data, and audio data, that have been compressed according to techniques such as frame encoding, field encoding, or motion compensation. As such software has been developed, there has been increasing demand for multimedia-oriented processors that can efficiently execute the software. These multimedia-oriented processors are processors designed with a special architecture to facilitate programming, such as the compression and decompression of video and audio data. The high-speed processing required for handling video data is the matrix multiplication of compressed data that has N*N matrix elements with coefficient data that also has N*N matrix elements. Representative examples of compressed data that has N*N matrix elements are the luminescence block composed of 16*16 luminescence elements, the blue color difference block (Cb block) composed of 8*8 color difference elements, and the red color difference block (Cr block) composed of 8*8 color difference elements used in MPEG (Moving Pictures Experts Group) techniques. The matrix multiplication for compressed data referred to here is performed very frequently when executing the approximation calculations for an inverse DCT (Discrete Cosine Transform) in image compression methods such as MPEG and JPEG (Joint Photographic Experts Group).

The following is a description of conventional multimedia-oriented processors that can perform high-speed matrix multiplication. The basic architecture of conventional multimedia-oriented processors is provided with a sum-product result register (hereinafter simply referred to as an MCR register) as hardware, and is provided with an instruction set that includes a "MOV MCR,**" transfer instruction for transferring a sum-product value.

An example of the hardware construction of a conventional multimedia-oriented processor is shown in FIG. 1. As shown in FIG. 1, the arithmetic logic unit (hereinafter, "ALU") 61 performs the multiplication of an element Fij that forms part of the compressed data and an element Gji that forms part of the coefficient matrix in accordance with a multiplication instruction. The ALU 61 also reads the sum-product value stored in the sum-product result register 62, adds the multiplication result of Gji*Fij to the read sum-product value, and has the result of this addition stored in the sum-product result register 62. By repeating the above calculation, a sum-product value is accumulated in the sum-product result register 62. Once the multiplication has been performed a predetermined number of times, the programmer issues a sum-product value transfer instruction. By issuing a transfer instruction, the accumulated value in the sum-product result register 62 is transferred to the general registers, and is used as the matrix multiplication result for one row and one column. By performing N*N iterations of the above processing, the matrix multiplication of N*N compressed data and an N*N coefficient matrix can be completed.

When a conventional multimedia-oriented processor is used, however, positive correction saturation operations for amending the sum-product value pose many difficulties for programmers.

Positive conversion processing refers to the conversion of a sum-product value that is a negative value into either zero or a positive value. Normally, compressed data is expressed as a coded relative value that reflects the relation of the present value to the preceding and succeeding values. As a result, there are many cases when the sum of products for each element in the compressed data and the corresponding coefficients is a negative value. Most reproduction-related hardware, such as displays and speakers, however is only able to process uncoded data, so that when the sum-product values are to be reproduced, it is first necessary to perform positive conversion processing.

Saturation calculation processing refers to processing that sets all values that exceed a given range (or, in other words, which are "saturated") at a predetermined value. This is to say, when an element that includes an erroneous bit generated during transfer is used in a sum-product calculation as part of the sum-product processing for compressed data, there is an increase in the probability of the sum-product value exceeding a value that can be expressed by the stated number of bits. Since most reproduction-related hardware is only physically capable of reproducing uncoded data with a fixed valid number of bits, such as eight bits, saturation processing is required to convert the sum-product value into a value that can be expressed using the valid number of bits.

It has been conventional practice to perform this kind of positive value conversion processing and saturation calculation processing by converting the-sum-product value using a subroutine that corrects the sum-product value. An example of a subroutine that corrects the sum-product value is explained below. In this example, the register width and the calculation width of the calculation unit are 32 bits, with the width of the MCR being 32 bits, and the sum-product value being expressed as a coded 16-bit integer. The data that can be handled by the reproduction-related hardware needs to be expressed using uncoded 8-bit integers. This subroutine is set as using the data register D0 for storing the calculation result. Each instruction is expressed using two operands, with the left and right operands being respectively called the first and the second operands. The second operand is used both to indicate the transfer address of a transfer instruction and the storage address of an arithmetical instruction.

Instruction 1: MOV MCR,D0
Instruction 2: CMP 0XFFFF_8000,D0
Instruction 3: BCC CARRY
Instruction 4: MOV 0x0000_00000,D0
Instruction 5: BRA END
CARRY:
Instruction 6: CMP 0x0000_00FF,D0
Instruction 7: BCS END
Instruction 8: MOV 0x0000_00FF,D0
END: (end of positive conversion saturation calculation processing)

Describing the above instructions in order, Instruction 1, "MOV MCR,D0", transfers the stored value of the MCR register into the data register D0. Instruction 2, "CMP 0xFFFF_8000,D0", compares the value in the data register with the immediate "0xFFFF_8000", where "0x" shows that the value is given in hexadecimal. This comparison is performed by subtracting the immediate "0xFFFF_8000" given in the first operand from the stored value of the data register D0 given in the second operand.

The sixteenth bit of the immediate "0xFFFF_8000" in Instruction 2 is the code bit used for a 16-bit coded integer, so that when the stored value of the data register D0 is greater that the immediate "0xFFFF_8000", this shows that the value stored in the MCR is a negative number.

On the other hand, when the stored value of the D0 register is less than "0xFFFF_8000", this shows that the value stored by the MCR is a positive number. If this number is a positive number, a carry is performed and the carry flag in the flag register is set.

The letter "B" in the "BCC" in Instruction 3 stands for "Branch", while the letters "CC" stand for "Carry Clear".

When the comparison in Instruction 2 finds that the stored value of the register D0 is less than the immediate "0xFFFF_8000", a branch is performed to Instruction 6 which has the label "CARRY". Conversely, when the comparison in Instruction 2 finds that the stored value of the register D0 is greater than the immediate "0xFFFF_8000", Instruction 4, "MOV 0x0000_0000,D0" transfers the value zero into the register D0, amending the sum-product value to zero. After this amendment, the unconditional branch "BRA END" in Instruction 5 is performed to transfer the processing to the "END" label, thereby completing the positive conversion processing.

The processing described above is performed when the stored value of the register D0 is negative. The following is a description of the processing performed when the stored value of the register D0 is greater than the immediate "0xFFFF_8000". In such a case, Instruction 6, "CMP 0x0000_00FF,D0" compares the stored value of the register D0 with the immediate "0x0000_00FF". This comparison is performed by subtracting the immediate "0x0000_00FF" given in the first operand from the stored value of the data register D0 given in the second operand. When the stored value of the D0 register is smaller than the immediate "0x0000_00FF", a carry is performed and the carry flag in the flag register is set.

The letters "CS" in Instruction 7, "BCS END", stand for "Carry Set", so that when the carry flag is set, a branch is performed to the label "END" from Instruction 7.

When the carry flag is not set, no branch is performed in Instruction 7 and processing advances to Instruction 8, "MOV 0x0000_00FF,D0", where the immediate "0x0000_00FF" is transferred into the register D0 to amend the calculation result to "0x0000_00FF", thereby completing the saturation calculation processing.

The problem with the sum-product value amendment process described above lies in the considerable increase in code size caused by the insertion of the above eight instructions for one amendment of a sum-product value. When the program is written into a ROM to embed the software into the information processing apparatus, the required amount of installed ROM will have to need to be increased by an amount equal to this increase in code size, leading to an increase in manufacturing cost. A large number of manufacturers of domestic appliances such as digital video players, electronic notebooks, and word processors seek to improve on their rivals' products by using their own decompression processing programs, although the installation of such decompression processing programs presently has the drawback of increasing costs by increasing the required amount of ROM, making such installation problematic.

There is also the problem that since eight instructions need to be executed to correct one sum-product value, there is a large increase in processing time. When, as shown in FIG. 2, an approximation calculation for an inverse DCT is performed by multiplying compressed data Fij (where i,j= 1,2,3,4,5 . . . 8) composed of 8*8 elements with a coefficient matrix Gji (where i,j=1,2,3,4,5 . . . 8) also composed of 8*8 elements to produce the multiplication result matrix Hij (where i,j=1,2,3,4,5 . . . 8), the calculation of the matrix multiplication result element H21 requires the sum-product processing of the multiplication results of one column of compressed data elements F11, F21, F31, F41, F51, F61, F71, F81 by one row of coefficient data elements G11, G12, G13, G14, G15, G16, G17, G18. The result is then subjected to positive conversion saturation calculation processing. Following this, the calculation of the matrix multiplication result element H12 requires the sum-product processing of the multiplication results of the column of compressed data elements F12, F22, F32, F42, F52, F62, F72, F82 by one row of coefficient data elements G11, G12, G13, G14, G15, G16, G17, G18, with the sum-product result then being subjected to positive conversion saturation calculation processing.

The same sum-product processing and positive conversion saturation calculation processing is required to obtain the other matrix multiplication result elements H21, H31, H41, H51, H61, H71, H81, . . . , and since there are 64 elements in the coefficient matrix Gij (where i,j=1,2,3,4,5 . . . 8), the sum-product value amending subroutine for positive conversion saturation calculation processing needs to be performed 64 times. This sum-product value amending subroutine includes branch instructions (as Instructions 3, 5, and 7), so that when this sum-product value amending subroutine is executed, branches will occur regardless of whether negative values or saturation occur, so that the 64 iterations of the subroutine will not be performed smoothly. When attempts are made to improve the processing speed of the sum-product operation by introducing pipeline processing to the processor, the execution of the stated three branch instructions will result in a noticeable drop in processing efficiency.

In order to increase the speed of the matrix multiplication, it is possible to install a specialized circuit for performing matrix multiplication. However, if all of the matrix multiplications are performed by a specialized circuit, there would be a vast increase in hardware, and the processor characteristic known as versatility, whereby the processor executes a variety of processes in accordance with the program written by the programmer, is lost. If the versatility of the processor is lost, there is the risk that the processor will not be able to respond to programmers' wishes, and so will not, for example, be able to execute an original decompression processing program.

SUMMARY OF THE INVENTION

It is a primary object of the present invention to provide a processor that can perform a rounding process made up of a positive conversion process and a saturation calculation process at high speed, while minimizing the increase in code size caused by the rounding process.

The stated object can be achieved by a processor that successively decodes and executes instructions in an instruction sequence, the instruction sequence including instructions that indicate a storage address of a value used in an operation, the processor including: a detecting unit for detecting whether a next instruction to be decoded includes an operation content indication showing that the next instruction is a correction instruction and, if present, reading the operation content indication; and a rounding unit for rounding, when the detecting unit has detected an operation content indication showing that the next instruction is a correction instruction, a coded m-bit integer stored at a storage address indicated by the instruction to a value expressed as an uncoded s-bit integer (where s<m).

With the stated construction, the processing for rounding values is performed once each time a correction instruction is detected out of the instruction sequence, so that the rounding process can be executed by the programmer writing only one instruction.

As the rounding process is performed according to one correction instruction, the execution time for one execution of the rounding process is extremely short. When the rounding of calculated values is required very often, such as when decompressing data, there will not be a significant increase in the time taken by the decompression processing.

Since the rounding process can be performed by simply executing a correction instruction, when the processor attempts to perform a sum-products operation at high speed through pipeline processing, there will be no confusion in the pipeline. Accordingly, the code size of the instruction sequence can be reduced and the execution of the instruction sequence made faster by adding a small amount of hardware to the processor.

The stated object can also be achieved by a processor that successively decodes and executes instructions in an instruction sequence, the instruction sequence including instructions that indicate a storage address of a value to be used in an operation, the processor including: a first detecting unit for detecting whether a next instruction to be decoded includes an indication showing that the instruction has a calculation performed; a second detecting unit for detecting whether the next instruction to be decoded includes an indication showing that calculation is to be performed and that rounding is-to be performed on a calculation result; a calculating unit for performing, when the first detecting unit detects that the next instruction includes an indication showing that the instruction has a calculation performed, a calculation using an m-bit integer in accordance with the indication; and a rounding unit for rounding, when the second detecting unit has detected that the next instruction to be decoded includes an indication showing that rounding is to be performed, a calculation result of a calculation that uses an m-bit integer to a value expressed as an uncoded s-bit integer (where s<m).

With the stated construction, correction instructions for performing a rounding process of a coded calculation result are provided, so that the two processes composed of a calculation process and a rounding process can be performed in a single step. As a result, positive conversion saturation calculation processing is performed in the same step as the calculation processing, so that the effective number of steps taken the positive conversion saturation calculation processing is zero.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 gives a representation of multiplication of matrices composed of N*N elements;

FIG. 5 shows an instruction sequence composing the matrix multiplication subroutine in the present embodiment;

FIG. 9 is a truth value table showing the relation of the combination of the output values of the constant generator 21 and the zero generator 25 with the output of the multiplexer 24;

DESCRIPTION OF THE PREFERRED EMBODIMENTS

First Embodiment

Figure 1:
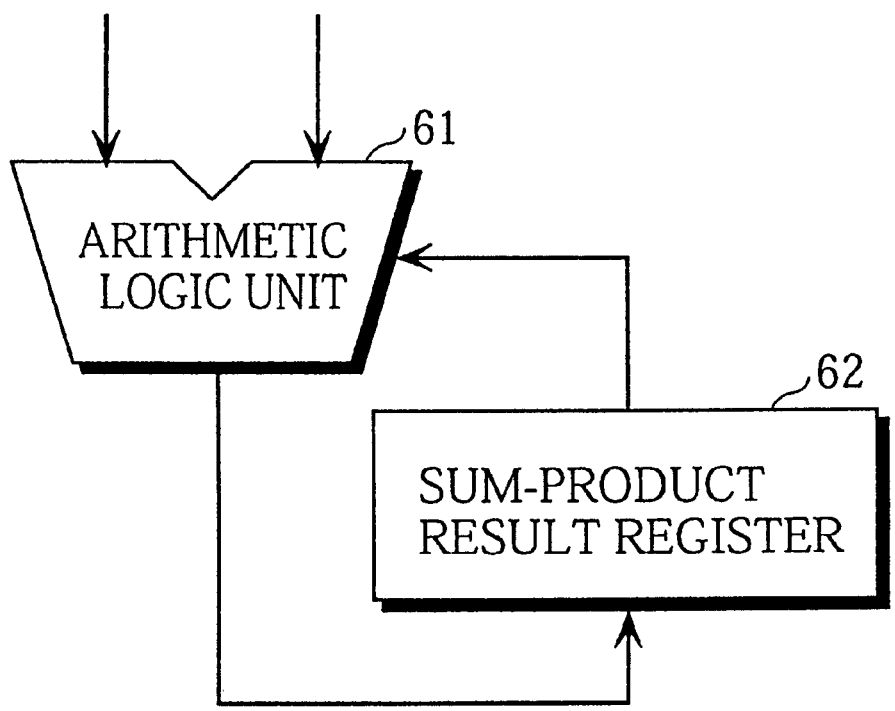
FIG. 1 shows a conventional construction composed of an ALU 61 and a sum-product result register 62.
Figure 3:
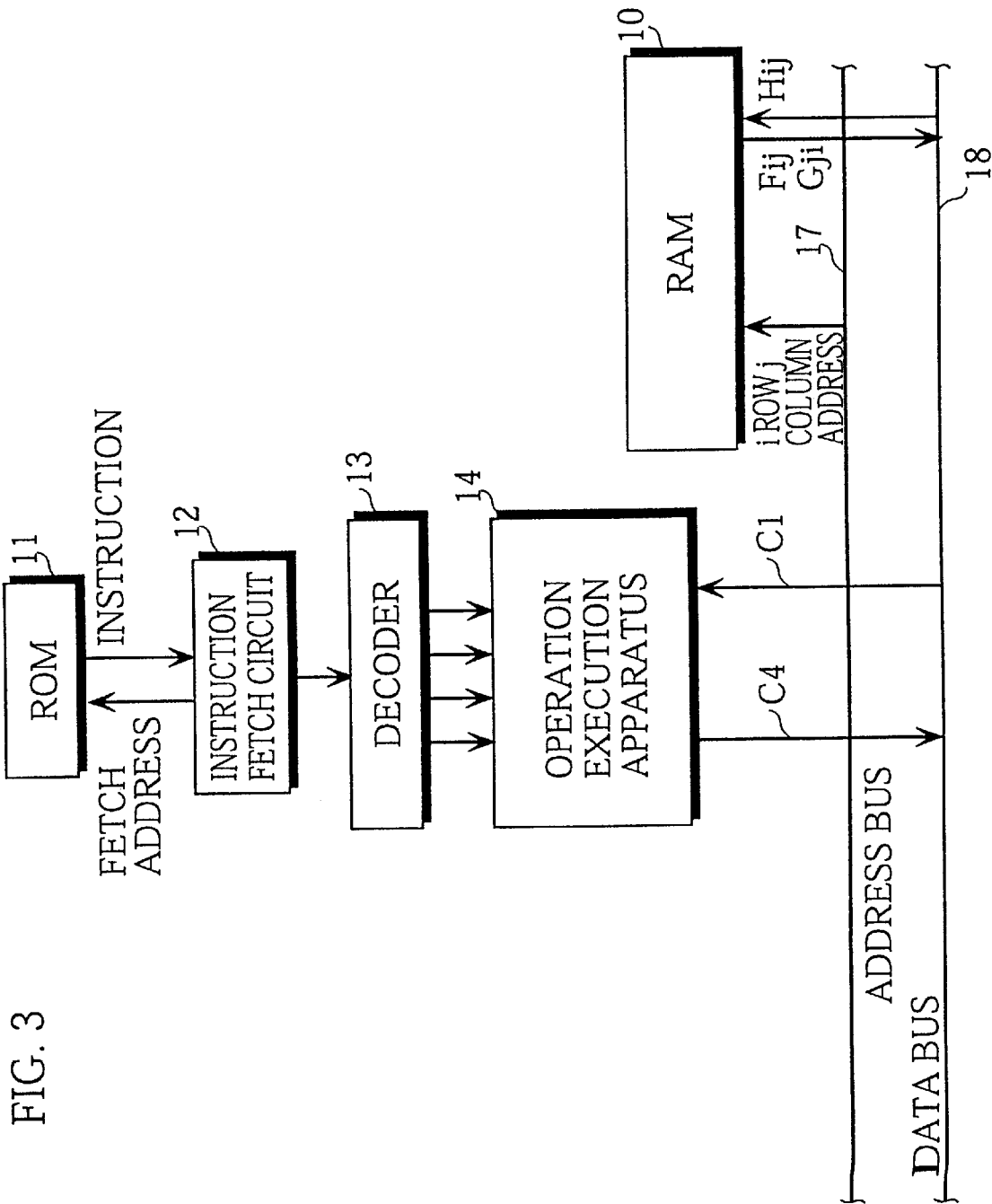
FIG. 3 shows the construction of the processor of the first embodiment of the present invention.

The following is an explanation of the first embodiment of the present invention with reference to the drawings. FIG. 3 shows the internal construction of the processor in the first embodiment of the present invention, which can be seen to be composed of a ROM 11, an instruction fetch circuit 12, a decoder 13, an operation execution apparatus 14, an address bus 17, and a data bus 18, with the address bus 17 and the data bus 18 being connected to the RAM 10.

The RAM 10 stores the compressed data Fij (i,j=1,2,3,4, 5 . . . 8) composed of 8*8 matrix elements and coefficient data Gji (i,j=1,2,3,4,5 . . . 8) composed of 8*8 matrix elements. When a fetch address for the ith row and jth column is outputted to the address bus 17, the data indicated by the outputted address is outputted to the data bus 18. When the operation execution apparatus 14 calculates the ith row and jth column element of the multiplication result matrix Hij (i,j=1,2,3,4,5 . . . 8) for the multiplication of the compressed data Fij composed of 8*8 matrix elements and the 8*8 matrix coefficients Gij, and the ith row and jth column address is outputted to the address bus 17 as the write address, the ith row and jth column element transferred to the data bus 18 is written into the storage area indicated by the outputted address. The multiplication result matrix Hij is used in an approximation calculation using an inverse DCT, is subjected to predetermined processing, and is used by the reproduction-related hardware (not illustrated). It should be noted here that Fij and Gji are expressed as 8-bit coded integers whose the eighth bit counted from the LSB (least significant bit) is used as the code bit.

ROM 11 stores a decompression processing program for the compressed data stored in the RAM 10, so that when a read address is outputted from the instruction fetch circuit 12, the instruction indicated by the read address in the stored decompression processing program is outputted to the data bus 18. The decompression processing program stored by the ROM 11 is composed of a variety of instructions, such as transfer instructions, arithmetic instructions, and branch instructions. Of these, the arithmetic instructions can be roughly classified into arithmetic calculation instructions, sum-product function multiplication instructions, and logic operation instructions. Arithmetic calculation instructions, such as addition instructions, subtraction instructions, and multiplication instructions each have a first operand and second operand. The first operand has two addressing modes that are an indication of an immediate and an indirect indication of a register. On the other hand, an indirect indication of a register is the only possible addressing mode for the second operand, although the second operand also doubles as an indication of the storage address for the calculation result. For the example of the addition instruction "ADD imm,D1", the first operand is the immediate value imm, while the second operand is the register D1. Since the second operand indicates the storage address for the calculation result, the calculation result of the addition instruction "ADD D0,D1" stores the result of the addition of the values in registers D0 and D1 in register D1.

In the present embodiment, the decompression processing program includes a matrix multiplication subroutine that generates the matrix multiplication result Hij with 8*8 elements by multiplying the compressed data Fij composed of 8*8 matrix elements by the coefficient data Gij composed of 8*8 matrix elements. It should be especially noted that this matrix multiplication subroutine is mainly composed of sum-product function multiplication instructions "MACCB Dm,Dn" and positive conversion saturation calculation instructions "MCSST Dm".

The following is a description of the generation of the matrix Hij with 8*8 elements by multiplying the compressed data Fij (i,j=1,2,3,4,5 . . . 8) composed of 8*8 matrix elements by the coefficient data Gji (i,j=1,2,3,4,5 . . . 8) also composed of 8*8 matrix elements. When doing so, the calculation shown in Equation 1 below is necessary to calculate the $1^{st}$ row, $1^{st}$ column element H11 of the matrix Hij.

$$H11=G11*F11+G12*F21+G13*F31+G14*F41+G15*F51+G16*F61+G17*F71+G18*F81 \quad \text{Equation 1}$$

This Equation 1 has Gji*Fij (i,j=1,2,3,4,5 . . . 8) as its elemental operations and is a compound operation which finds an algebraic sum of the elemental operations. The calculation of the respective elemental operations and the calculation of the algebraic sum are expressed in the present matrix multiplication subroutine by a loop statement (this loop statement being called a "sum-product loop") that repeatedly has a sum-product function multiplication instruction "MACCB Dm,Dn" performed.

FIG. 5 shows an example of the matrix multiplication subroutine. It should be noted here that the summaries of the instructions in FIG. 5 are given in the comments given to the right of each instruction (starting with the symbol "#"). In FIG. 5, F_ENTRY is a label attached to the start of the region in the RAM 10 that stores the compressed data, while G_ENTRY is a label attached to the start of the region in the RAM 10 that stores the coefficient data. In the same way, H_ENTRY is a label attached to the start of the region in the RAM 10 that stores the result of the matrix multiplication. Instruction 1, "MOV F_ENTRY, A0", instruction 2, "MOV G_ENTRY, A1", and instruction 3, "MOV H_ENTRY, A2" are transfer instructions that respectively transfer the addresses F_ENTRY, G_ENTRY, and H_ENTRY into the address register A0, the address register A1, and the address register A2.

As a result of the transfer instructions mentioned above, the address registers A0, A1, and A2 are used to indicate the read addresses for the compressed data, the coefficient data, and the matrix multiplication result data which are each composed of 8*8 elements.

Instruction 4, "MOV INIT,D2", sets the initial value INIT for the number of iterations into the data register D2, while instruction 5, "MOV (A0),D0", has the coefficient data Fji read from the address indicated by the address register A0 transferred to the data register D0. Instruction 6, "MOV (A1),D1", has the compressed data Gij read from the address indicated by the address register A1 transferred to the data register D1. Instruction 7, "MACCB D0,D1", is a multiplication instruction with a sum-product function that uses the data register D0, the data register D1, and the sum-product result register 6. Instruction 8, "CMP NUMBER,D2" is an instruction which performs an upper limit check on the number of iterations by subtracting the total number of iterations NUMBER from the number of iterations stored in the data register D2.

Instruction 9, "BCS LP1_NEXT" is a conditional branch instruction that branches to instruction 13 "ADD 1,D2" with the label LP1_NEXT when the carry flag is ON as a result on the subtraction performed in instruction 8 "CMP NUMBER, D2".

Instruction 10, "MCSST D1" is an instruction that performs conversion to a positive value and saturation calculation processing (hereinafter referred to as "positive conversion saturation calculation processing") when the carry flag is OFF.

Instruction 13, "INC D2" is an addition instruction that increments the number of iterations stored in the data register D2 by 1, while instruction 14, "INC A0", is an addition instruction that increments the read address for coefficient data stored in the address register A0 by 1. Instruction 15, "ADD ROW1,A1", is an addition instruction that adds one row number ROW1 to the read address of the coefficient data stored in the address register A1. Instruction 16, "BRA LP1_START", is an unconditional branch instruction that branches to the label LP1_START.

The label LP1_START is attached to instruction 5, "MOV (A0),D0", with the instruction sequence from instruction 5 to instruction 12, "BRA LP1_END" calculating one elemental operation, with the algebraic sum of the calculation results of all iterations of this instruction sequence being found.

The label LP1_NEXT is attached to instruction 13, "ADD 1,D2", with the instruction sequence from instruction 13 to instruction 16, "BRA LP1_START" moving the read address of the compressed data to a next row and the read address of the coefficient data to the next column when the matrix multiplication of one row of elements by one column of elements has been completed. At the same time, the number of iterations stored in the data register D2 is incremented by 1.

Figure 6:
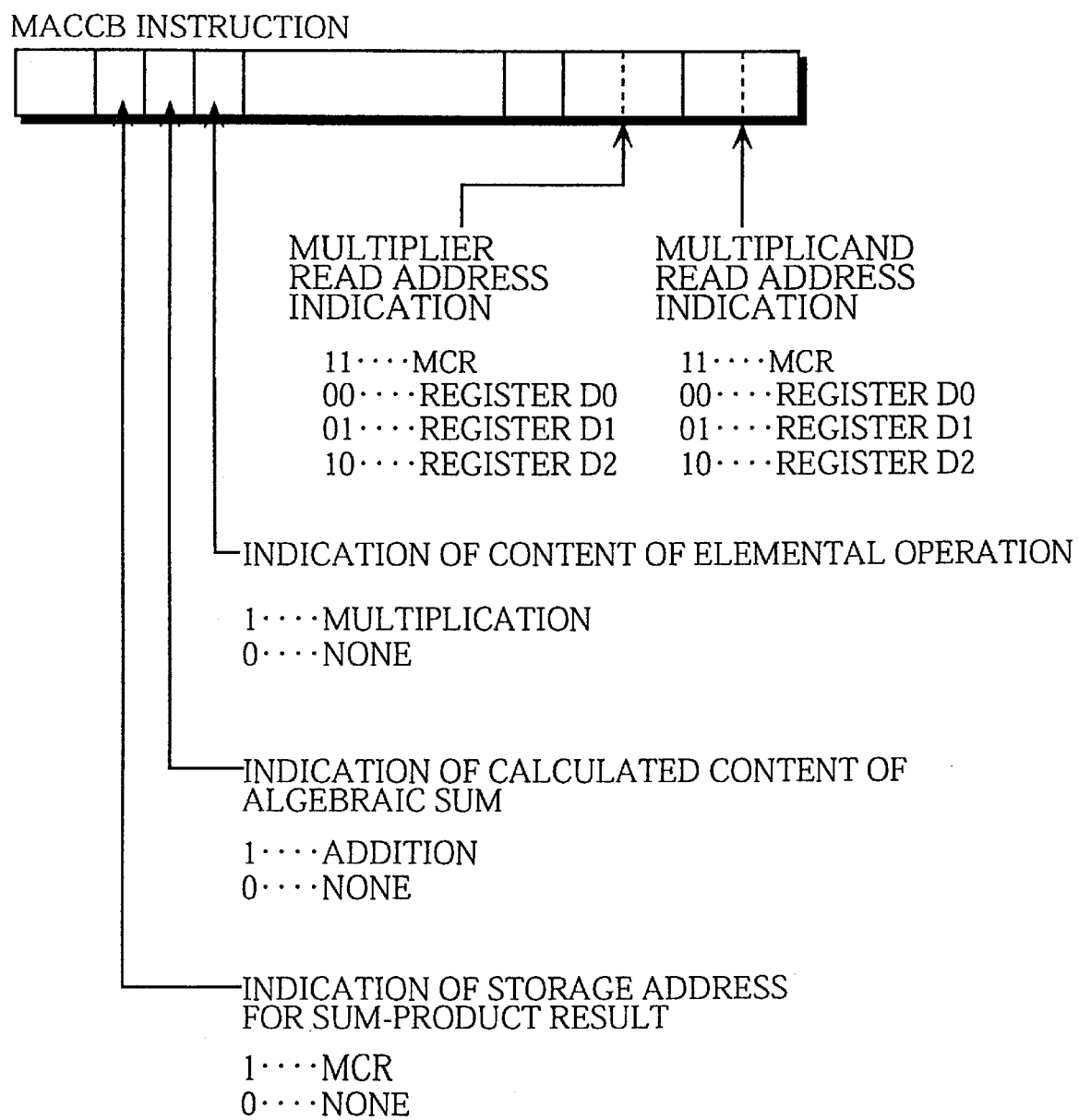
FIG. 6 shows the instruction format of a sum-product function multiplication instruction "MACCB D0,D1" in the present embodiment.

FIG. 6 shows the format of the sum-product function multiplication instruction "MACCB Dm,Dn". As shown in FIG. 6, the sum-product function multiplication instruction "MACCB Dm,Dn" includes a one-bit field for indicating the storage address of a sum-product value, a one-bit field for indicating the calculated content of the algebraic sum, a one-bit field for indicating the elemental calculation content of the elemental operation, a two-bit field for indicating a read address of the multiplier, and a two-bit field for indicating a read address of the multiplicand.

The field indicating the read address of the multiplier and the field indicating the read address of the multiplicand can each be set at one of "00", "01", "10", and "11", thereby indicating one of data register D0, data register D1, data register D2, and the sum-product result register 6 as a read address for the multiplier Gji or the multiplicand Fij.

The one-bit field for indicating the calculated content of the elementary operation shows the content of the calculation of the elementary operation performed for the multiplier Gji and the multiplicand Fij. When "1" is written into this field, the multiplication "Gji*Fij" of the multiplier Gij and the multiplicand Fij is indicated as the content of the elementary operation on the multiplier Gji and the multiplicand Fij.

When the one-bit field indicating the storage address of a sum-product value is set at "1", this indicates that the MCR (the sum-product result register 6 which is described later) is set as the storage address of the sum-product value. When the one-bit field indicating the calculated content of the algebraic sum is set at "1", this shows that the algebraic sum is set so that the multiplication result "Gji*Fij" is added to the sum-product value stored in the sum-product result register 6.

When the sum-product operation "G11*F11+G12*F21+G13*F31 . . . " is performed, it should be noted that a bit error when transferring the element Fij of the compressed data can result in a sum-product value ""G11*F11+G12*F21+G13*F31 . . . " which is beyond a reproducible range for the reproduction-related hardware. Since this risk exists, the matrix multiplication subroutine performs the positive conversion saturation calculation instruction "MCSST Dm" after the loop processing repeating the sum-product function multiplication instruction "MACCB D0,D1" has been completed, so that positive conversion saturation calculation processing is performed for the sum-product value.

Figure 7:
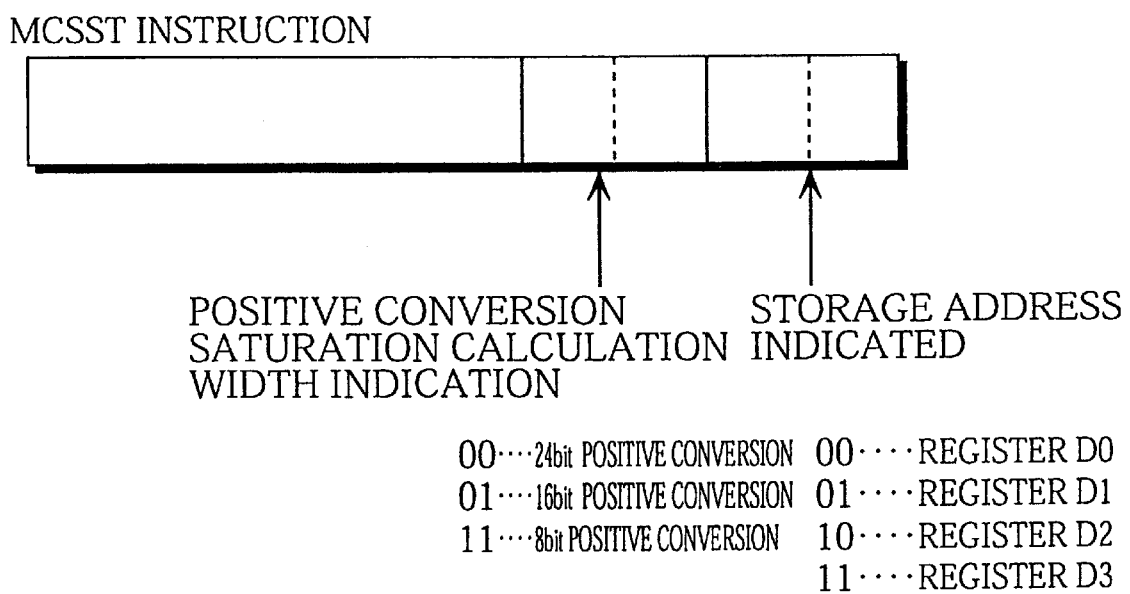
FIG. 7 shows the instruction format of a positive conversion saturation calculation instruction "MCSST" in the present embodiment.

The format of the operation codes for the positive conversion saturation calculation instruction "MCSST Dm" is shown in FIG. 7. As shown in FIG. 7, the positive conversion saturation calculation instruction "MCSST Dm" includes a field ("rounding field") indicating the positive conversion/saturation calculation width and a field indicating the storage address of the positive conversion saturation calculation result. By writing one of "01", "10", and "11" into the rounding field, the rounding width of the positive conversion saturation calculation processing can be set at 24 bits, 16 bits, or 8 bits. Conversely, by writing one of "00", "01", "10", and "11" into the storage address indicating field, one of the data register D0, the data register D1, the data register D2, and the data register D3 can be indicated as the storage register for the positive conversion saturation calculation processing.

As described above, the decompression processing program stored in the ROM 11 is such that the elementary operations and the algebraic sum calculation that compose the compound operation that is required by the matrix multiplication subroutine are performed by a sum-product function multiplication instruction "MACCB Dm,Dn", so that the algorithm is very compact. Since only this operation needs to be performed by the processor, the memory area of the ROM 11 that is used by the decompression processing program is extremely small.

This completes the description of the instruction sequences stored in the ROM 11, so that the following explanation will instead focus on the constructional elements of the processor shown in FIG. 3.

The instruction fetch circuit 12 shown in FIG. 3 includes a program counter that successively generates read addresses and outputs them to the address bus. This instruction fetch circuit 12 then transfers the instructions outputted to the data bus 18 by the ROM 11 to the decoder 13.

The decoder 13 has an instruction buffer for accumulating the plurality of instructions that are read from the data bus 18 and an instruction register for holding an instruction to be decoded, out of the plurality of instructions accumulated in the instruction buffer. The decoder 13 decodes the instruction stored in the instruction buffer and has the operation execution apparatus 14 perform the necessary control to have the decoded instruction executed. Of the control operations mentioned here, special attention should be paid to (1) register output control, (2) calculation execution control, and (3) constant generation control. These are described in more detail below.

(1) Register output control refers to a controlling of the operation execution apparatus 14 to output a stored value of a register indicated by either the first or second operand in an arithmetic calculation instruction, a logic operation instruction, or a sum-product function multiplication instruction. (2) Calculation execution control refers to a controlling of the operation execution apparatus 14 to execute the calculation indicated by an arithmetic calculation instruction, a logic operation instruction, or a sum-product function multiplication instruction. (3) Constant generation control refers to a controlling of the operation execution apparatus 14 to generate a maximum value or zero for performing a positive conversion saturation calculation instruction. The (1) register output control and the (2) calculation execution control are performed when an arithmetic calculation instruction, a logic operation instruction, or a sum-product function multiplication instruction is decoded by the decoder 13, while the (1) register output control and the (3) constant generation control are performed when a positive conversion saturation calculation instruction is decoded by the decoder 13. Occurrences of (2) calculation execution control only happen when a sum-product function multiplication function is decoded, while occurrences of (3) constant generation control only happen when a positive conversion saturation calculation instruction is decoded, so that the (2) calculation execution control and the (3) constant generation control are mutually exclusive.

The address bus 17 has a bit width of 32 bits and is used to transfer the compressed data Fji, the coefficient data Gij, and the matrix multiplication data Hij when data is outputted by the RAM 10.

The operation execution apparatus 14 includes a register file and an ALU circuit, and performs calculation according to control by the decoder 13.

Figure 12A:
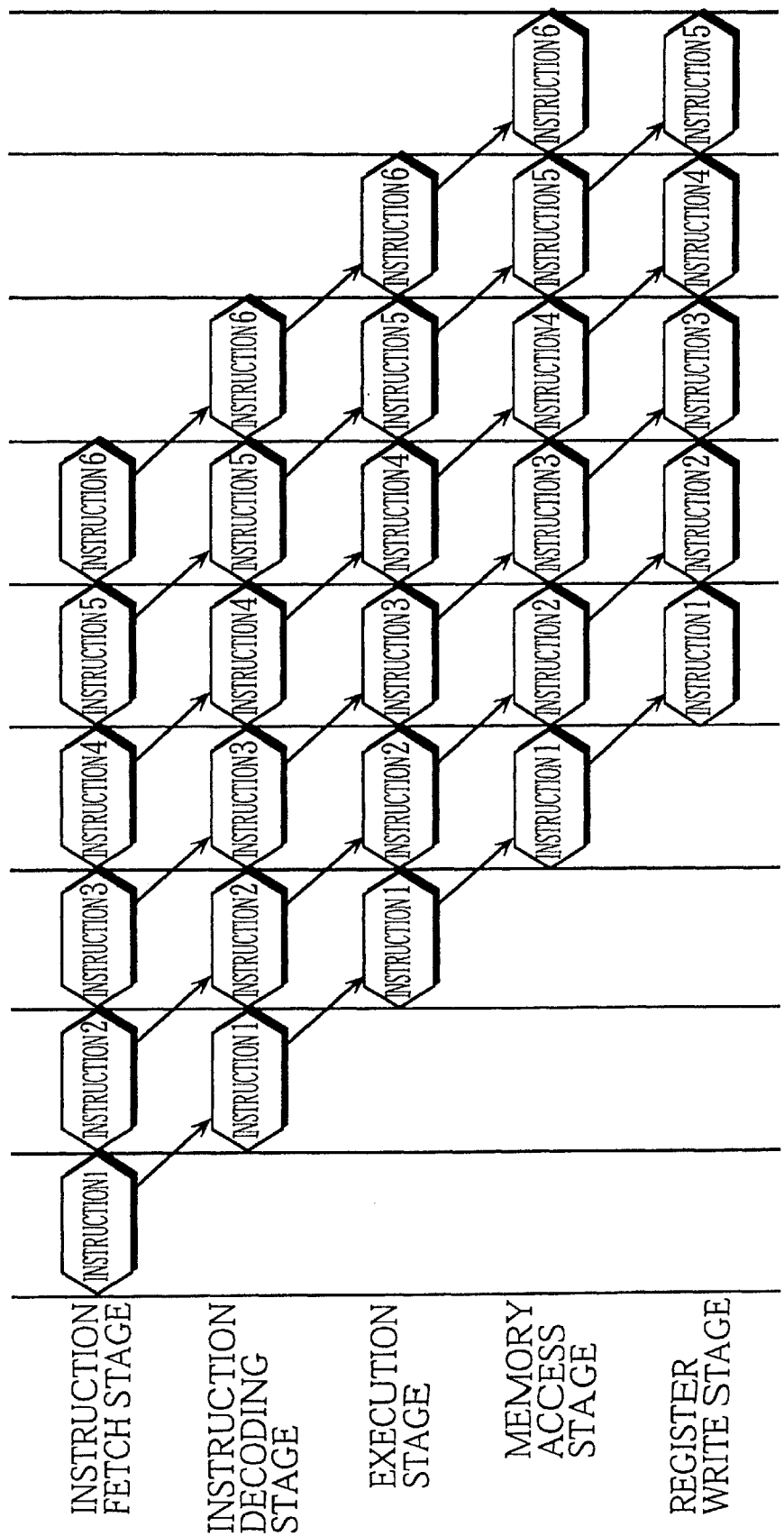
FIG. 12A shows an example of the pipeline processing performed by the processor shown in FIG. 3.

It should be especially noted here that the construction is such that the instruction fetch circuit 12 performs the fetch stage, the decoder 13 the decoding stage, and the operation execution apparatus 14 the operation execution stage, the memory write stage, and the register write stage. These five stages are realized by a five-stage pipeline process. The instruction fetch circuit 12 starts to fetch another instruction once an instruction has entered the decoding stage performed by the decoder 13, and so does not wait for the execution of the present and preceding instructions to be completed. In the same way, the decoder 13 does not wait for the execution of the present and preceding instructions to be completed, and so starts to decode a new instruction once a decoded instruction has entered the operation execution stage performed by the operation execution apparatus 14. By performing such processing, the processor processes the instruction sequence stored in the ROM 11 according to a five-stage pipeline process composed of an instruction fetch stage, a decoding stage, an execution stage, a memory access stage, and a register write stage, as shown in FIG. 12A.

Figure 4:
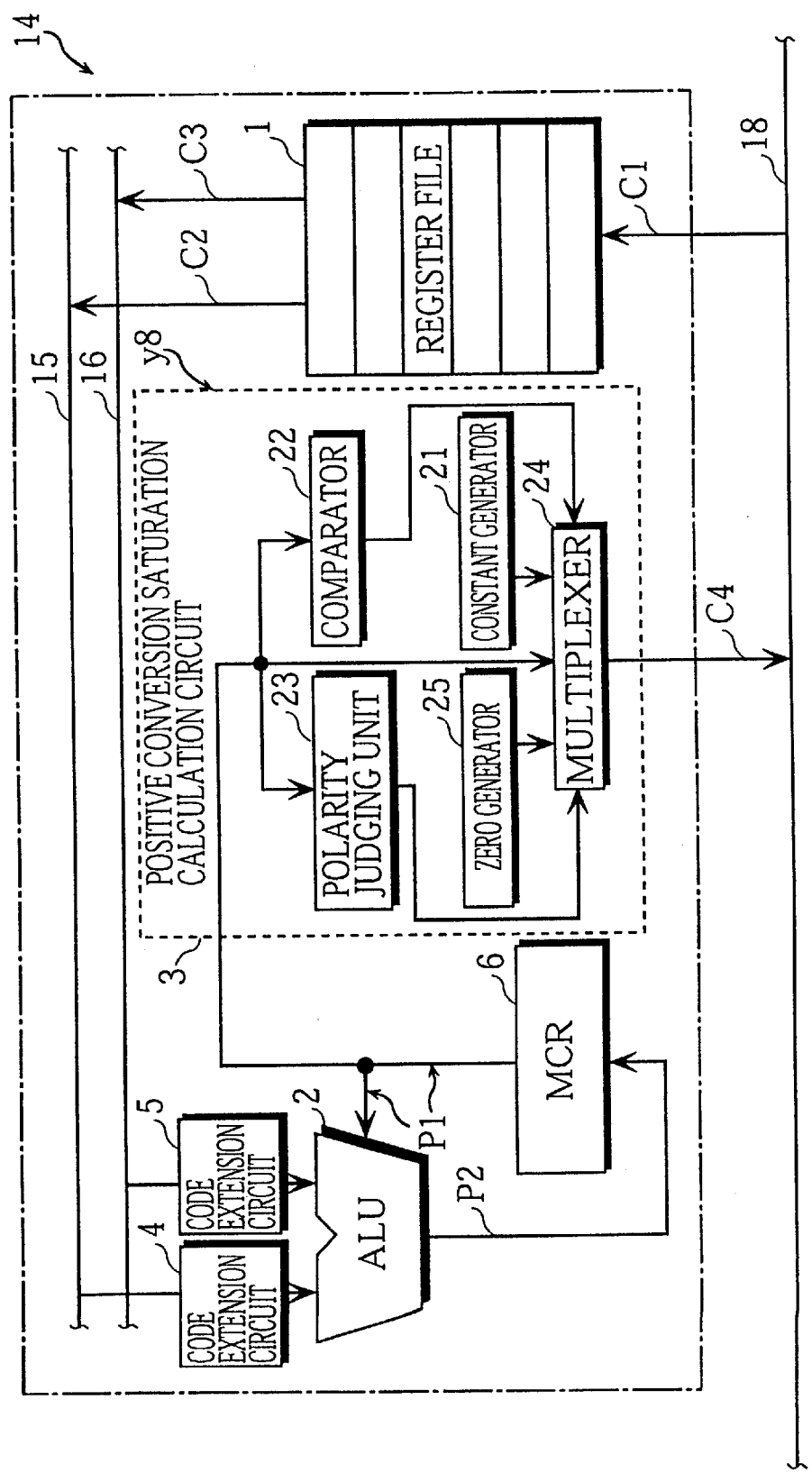
FIG. 4 shows the construction of the operation execution apparatus 14 in the present embodiment.

This completes the description of the constructional elements of the processor. The following description will focus on the internal construction of the operation execution apparatus 14. As shown in FIG. 4, the operation execution apparatus 14 is composed of a register file 1, an ALU circuit 2, a positive conversion saturation calculation circuit 3, a code extension circuit 4, a code extension circuit 5, a sum-product result register 6, a first internal bus 15, and a second internal bus 16. A number of control signal lines are used to connect these components to the decoder 13 so that the control operations (1), (2), and (3) described earlier can be performed, although for ease of understanding these control signal lines have been omitted from FIG. 4.

The register file 1 is composed of four 32-bit data registers D0–D3, and three 32-bit address registers A0–A2. During (1) register output control, when one or two register names are indicated by the decoder 13, the register file 1 has the stored values of the registers with the indicated register names outputted via paths C2, C3 to the first internal bus 15 and the second internal bus 16. The register file 1 also holds the value transferred on the data bus 18 which it receives via the path C1.

The first internal bus 15 is 32 bits wide and transfers a 32-bit stored value outputted by the register file 1 to the ALU circuit 2.

The second internal bus 16 is also 32 bits wide and transfers a 32-bit stored value outputted by the register file 1 to the ALU circuit 2.

The code extension circuit 4 performs code extension when the stored value of a data register transferred from the register file 1 via the first internal bus 15 is a negative number. In the present embodiment, multipliers and multiplicands are defined as coded 8-bit numbers, so that the code extension circuit 4 performs code extension of 8-bit negative numbers. As one example, when the stored value transferred via the first internal bus 15 is the 8-bit negative value "0x0000_0080", the code in the $8^{th}$ bit is extended to the $9^{th}$ through $32^{nd}$ bits so that the value "0xFFFF_FF80" is outputted to the ALU circuit 2.

The code extension circuit 5 performs code extension when the stored value of a data register transferred from the register file 1 via the second internal bus 16 is a negative number. In the present embodiment, multipliers and multiplicands are defined as coded 8-bit numbers, so that the code extension circuit 5 performs code extension of 8-bit negative numbers. The method used for code extension is the same as for the code extension circuit 4.

The ALU circuit 2 is composed of an addition unit, a multiplication unit, and a barrel shifter that are all 32-bits wide, and performs calculations according to the (2) calculation execution control indicated by the decoder 13. Since the input terminals of the ALU circuit 2 are connected to the output terminals of the code extension circuit 4 and the sum-product result register 6, the calculation performed according to the (2) calculation execution control is performed using the 32-bit stored value of a register which is outputted by the code extension circuit 4 and the 32-bit stored value of a register which is outputted by the sum-product result register 6.

When a sum-product function multiplication instruction "MACCB Dm,Dn" is decoded, the ALU circuit 2 performs multiplication of the 32-bit stored value of a register outputted by the code extension circuit 4 and the 32-bit stored value of a register outputted by the code extension circuit 5 and outputs a 64-bit multiplication result. The ALU circuit 2 also adds the 32-bit value transferred on the path P1 to the lower-order 32 bits of the 64-bit multiplication result and outputs a 32-bit addition result on the path P2.

It should be noted here that when the sum-product function multiplication instruction "MACCB D0,DL1" is decoded, the stored values of the read address registers indicated by the first and second operands of the sum-product function multiplication instruction "MACCB D0,D1" will be transferred on the first internal bus 15 and the second internal bus 16, so the ALU circuit 2 will perform the multiplication of the stored value of the register D0 and the stored value of the register D1. Also, when the sum-product function multiplication instruction "MACCB D0,D1" is decoded, the stored value of the sum-product result register 6 will be transferred on the path P1, so that the multiplication result of the data register D0 and the data register D1 will be added to the stored value of the sum-product result register 6 which has been outputted to the path P1. The result of this addition is then outputted on the path P2.

The sum-product result register 6 stores the sum-product value which has hitherto been accumulated, and outputs its stored value on the path P1 every time a sum-product function multiplication instruction is decoded. When the stored value on the path P1 and the multiplication result have been added by the ALU circuit 2, the addition result is outputted on the path P2, with this value being latched by the sum-product result register 6 and stored as the updated sum-product value. It should be noted here that the sum-product result register 6 stores the result of the multiplication by the ALU circuit 2 of the multiplier Gji and the multiplicand Fij as a coded 16-bit value.

Figure 8A:
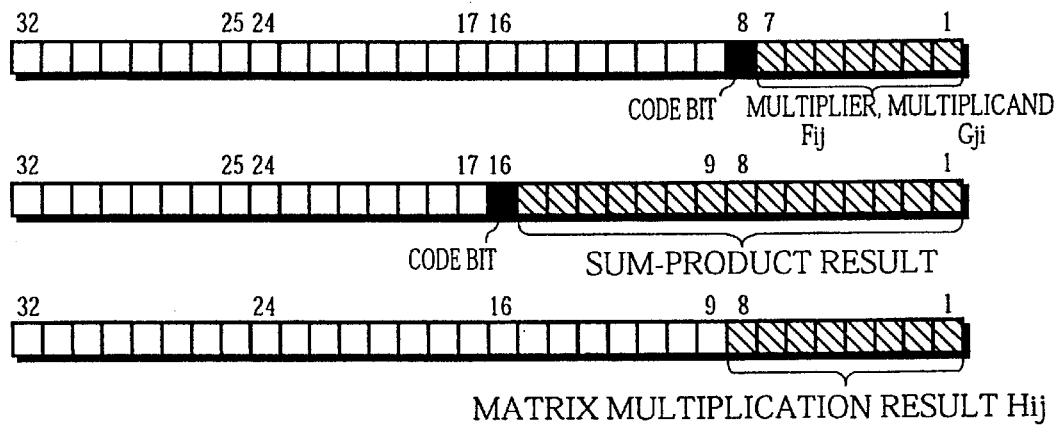
FIG. 8A shows the 32-bit expressions that are the multiplier, the multiplicand, the sum-product value, and the matrix multiplication result element.
Figure 8B:
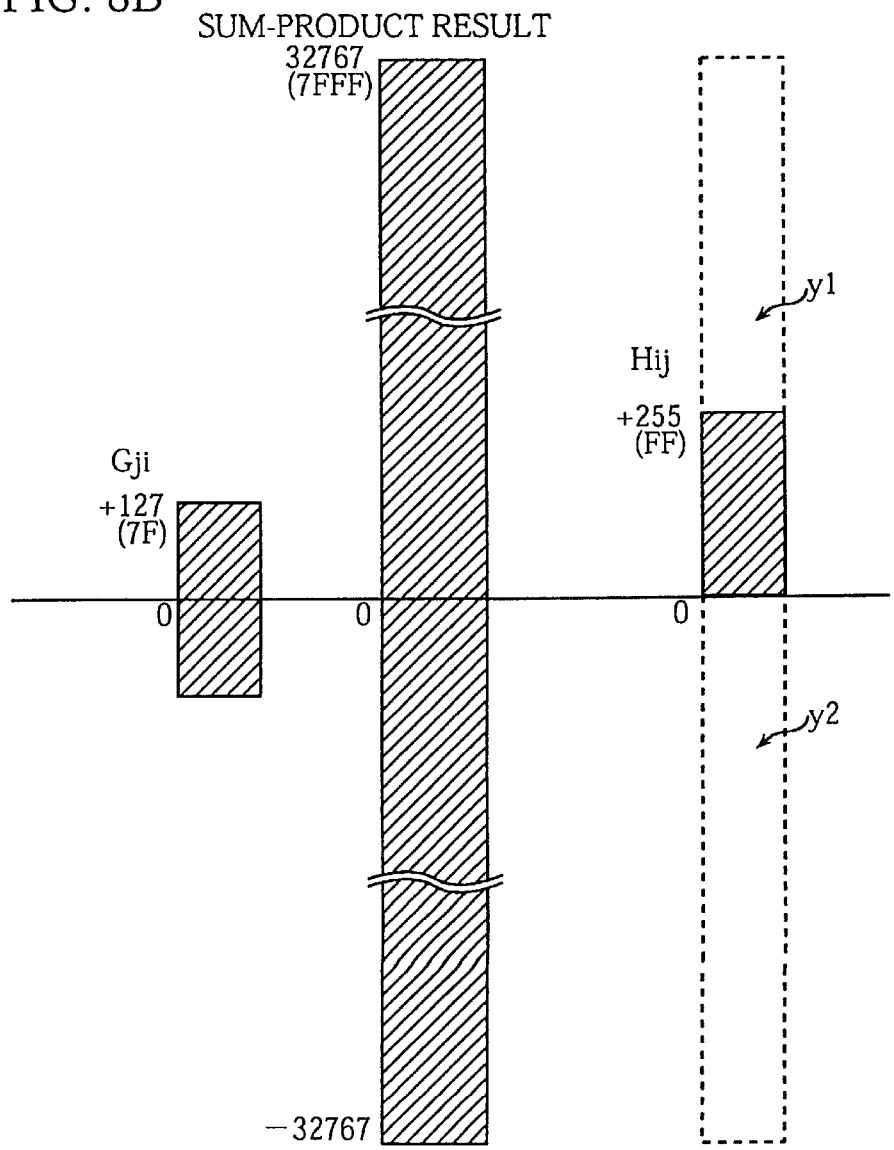
FIG. 8B shows how the sum-product value is converted by the positive conversion saturation calculation circuit 3.

The positive conversion saturation calculation circuit 3 rounds the stored value of the sum-product result register 6 expressed as a coded 16-bit value to a positive 8-bit integer. FIGS. 8A and 8B show the rounding process performed by the positive conversion saturation calculation circuit 3. The top part of FIG. 8A shows the multiplier and multiplicand expressed in 32-bit data. Here, the black-shaded $8^{th}$ bit is allocated as the code bit, so that by using oblique-shaded 7 bits, the multiplier Gji and the multiplicand Fij can be expressed as values within the range −127 to +127.

The middle part of FIG. 8A shows the sum-product result expressed in 32-bit data. Here, the black-shaded $16^{th}$ bit is allocated as the code bit, so that by using oblique-shaded 15 bits, the sum-product value can be expressed as a value in the range −32767 to +32767.

The lower part of FIG. 8A shows the multiplication matrix element Hij expressed in 32 bits. Here, the oblique-shaded first to eighth bits are used without a code bit, so that the multiplication matrix element Hij can be expressed as any value in the range 0 to +255.

In FIG. 8B, the bar on the left shows the range of stored values of registers that can be used as the multiplier and multiplicand, which is a seven bit range of positive and negative values. The bar in the center shows the range of values that can be stored in the sum-product result register 6 as the sum-product value, which is a fifteen bit range of positive and negative values. The bar on the right shows the range of values that can be used for the multiplication matrix Hij, which is the range of 8-bit positive values that can be handled by the reproduction-related hardware.

It should be noted here that the range of values that can be used the sum-product value is a range of 15-bit positive and negative values to avoid the totaling of rounding errors. In more detail, when the sum-product value is found from the multiplication result of the multiplier Gji and the multiplicand Fij which are both coded 8-bit values, if the multiplication result were to be rounded to eight bits every time because the range of the multiplication matrix element Hij is eight bits, the rounding error would increase every time multiplication is performed. To avoid such increases in rounding error, the sum-product result register 6 sets the sum-product result as 16 bits and the positive conversion saturation calculation is only performed when the multiplication of one row by one column has been completed.

The stored value of the sum-product result register 6 shown by the bar in the center of FIG. 8B is rounded to the 8-bit positive value shown by the right bar, so that the range of values indicated by the symbol y1 (the range of positive values that exceed "0x0000_00FF") are all rounded to "0x0000_00FF".

The positive conversion saturation calculation circuit 3 rounds the range of values shown by the symbol y2 (negative values) to the value "0x0000_0000".

The internal construction of the positive conversion saturation calculation circuit 3 is shown inside the broken line y8 in FIG. 4. As shown in FIG. 4, the positive conversion saturation calculation circuit 3 is composed of a constant generator 21, a comparator 22, a polarity judging unit 23, a multiplexer 24, and a zero generator 25. These components are connected by control lines to the decoder 13, although these have been omitted from FIG. 4 for ease of understanding.

When the instruction read by the instruction fetch circuit 12 and decoded by the decoder 13 is a positive conversion saturation calculation instruction "MCSST", the constant generator 21 generates a maximum positive value which, in accordance with the content of the positive conversion-saturation calculation width field, is an 8-bit uncoded value, a 16-bit uncoded value, or a 24-bit uncoded value. When the generation of an 8-bit uncoded value is indicated by the positive conversion-saturation calculation width field, the constant generator 21 generates the 32-bit coded value "0x0000_00FF", which is the maximum value for an uncoded 8-bit value, and outputs it to the multiplexer 24. When the generation of a 16-bit uncoded value is indicated by the positive conversion-saturation calculation width field, the constant generator 21 generates the 32-bit coded value "0x0000_FFFF", which is the maximum value for an uncoded 16-bit value, and outputs it to the multiplexer 24. Similarly, when the generation of a 24-bit uncoded value is indicated by the positive conversion-saturation calculation width field, the constant generator 21 generates the 32-bit coded value "0x00FF_FFFF", which is the maximum value for an uncoded 24-bit value, and outputs it to the multiplexer 24.

The comparator 22 compares the magnitude of the value held by the sum-product result register 6 with the magnitude of maximum value outputted by the constant generator 21. This comparison is performed by subtracting the value held by the constant generator 21 from the maximum value outputted by the constant generator 21 and detecting whether a carry has occurred as a result of the subtraction. When an 8-bit value is indicated by the positive conversion-saturation calculation width field, the stored value of the sum-product result register 6 is subtracted from the 32-bit coded integer "0x0000_00FF", which is the maximum value for an uncoded 8-bit value. When a 16-bit value is indicated by the positive conversion-saturation calculation width field, the stored value of the sum-product result register 6 is subtracted from the 32-bit coded integer "0x0000_FFFF", which is the maximum value for an uncoded 16-bit value. Similarly, when a 24-bit value is indicated by the positive conversion-saturation calculation width field, the stored value of the sum-product result register 6 is subtracted from the 32-bit coded integer "0x00FF_FFFF", which is the maximum value for an uncoded 24-bit value.

When a carry is detected as the result of the subtraction described above and the latched value is judged to exceed the maximum value, the comparator 22 outputs the logic value "1" to the multiplexer 24. Conversely, when the value held by the sum-product result register 6 is judged to be equal to or below the maximum value, the comparator 22 outputs the logic value "0" to the multiplexer 24.

The polarity judging unit 23 judges whether the code bit of the value stored by the sum-product result register 6 is "ON". Here, depending on the content the positive conversion-saturation calculation width field of the positive conversion saturation calculation instruction "MCSST", an 8-bit uncoded value, a 16-bit uncoded value, or a 24-bit uncoded value is indicated, so that the position of the code bit will change. As a result, the polarity judging unit 23 changes the bit which is to be judged in accordance with the indication in the positive conversion-saturation calculation width field of the positive conversion saturation calculation instruction "MCSST".

When the indication in the positive conversion-saturation calculation width field of the positive conversion saturation calculation instruction "MCSST" is for a 24-bit uncoded value, the polarity judging unit 23 judges whether the $24^{th}$ bit from the LSB side is "ON", while when the indication in the positive conversion-saturation calculation width field of the positive conversion saturation calculation instruction "MCSST" is for a 16-bit uncoded value, the polarity judging unit 23 judges whether the $16^{th}$ bit from the LSB side is "ON". Similarly, when the indication in the positive conversion-saturation calculation width field of the positive conversion saturation calculation instruction "MCSST" is for an 8-bit uncoded value, the polarity judging unit 23 judges whether the $8^{th}$ bit from the LSB side is "ON". This judgement refers to a judgement of whether the sum-product value held by the sum-product result register 6 is expressed as a negative number when values are expressed in accordance with the indication given in the positive conversion-saturation calculation width field of the positive conversion saturation calculation instruction "MCSSTI". When the value is a negative value, the polarity judging unit 23 outputs the logic value "1" to the multiplexer 24. Conversely, when the value is zero or a positive value, the polarity judging unit 23 outputs the logic value "0" to the multiplexer 24.

The zero generator 25 generates the integer "0x0000_0000" when the decoded instruction is a positive conversion saturation calculation instruction "MCSST".

The multiplexer 24 selects and outputs one of the maximum value generated by the constant generator 21, the zero value "0x0000_0000" generated by the zero generator 25, and the sum-product value held by the sum-product result register 6, in accordance with the combination of the logic values outputted by the comparator 22 and the polarity judging unit 23.

If the logic value outputted by the comparator 22 is set as the logic value x and the logic value outputted by the polarity judging unit 23 is set as the logic value y, the correspondence between the combinations of these logic values and the output value of the multiplexer 24 can be expressed by the truth table shown in FIG. 9. It should be noted here that the example truth table shown in FIG. 9 shows the case when the maximum value outputted by the constant generator 21 "0x0000_00FF".

As shown in FIG. 9, when the output value of the comparator 22 is "0" and the output value of the polarity judging unit 23 is "0", the multiplexer 24 outputs the held value of the sum-product result register 6.

When the output value of the comparator 22 is "1" and the output value of the polarity judging unit 23 is "0", the multiplexer 24 outputs the maximum value "0x0000_00FF" generated by the constant generator 21.

When the output value of the comparator 22 is "0" and the output value of the polarity judging unit 23 is "1", the multiplexer 24 outputs the zero value "0x0000_0000" generated by the zero generator 25. When the output value of the comparator 22 is "1" and the output value of the polarity judging unit 23 is "1", the multiplexer 24 outputs the zero value "0x0000_0000" generated by the zero generator 25.

Figure 10:
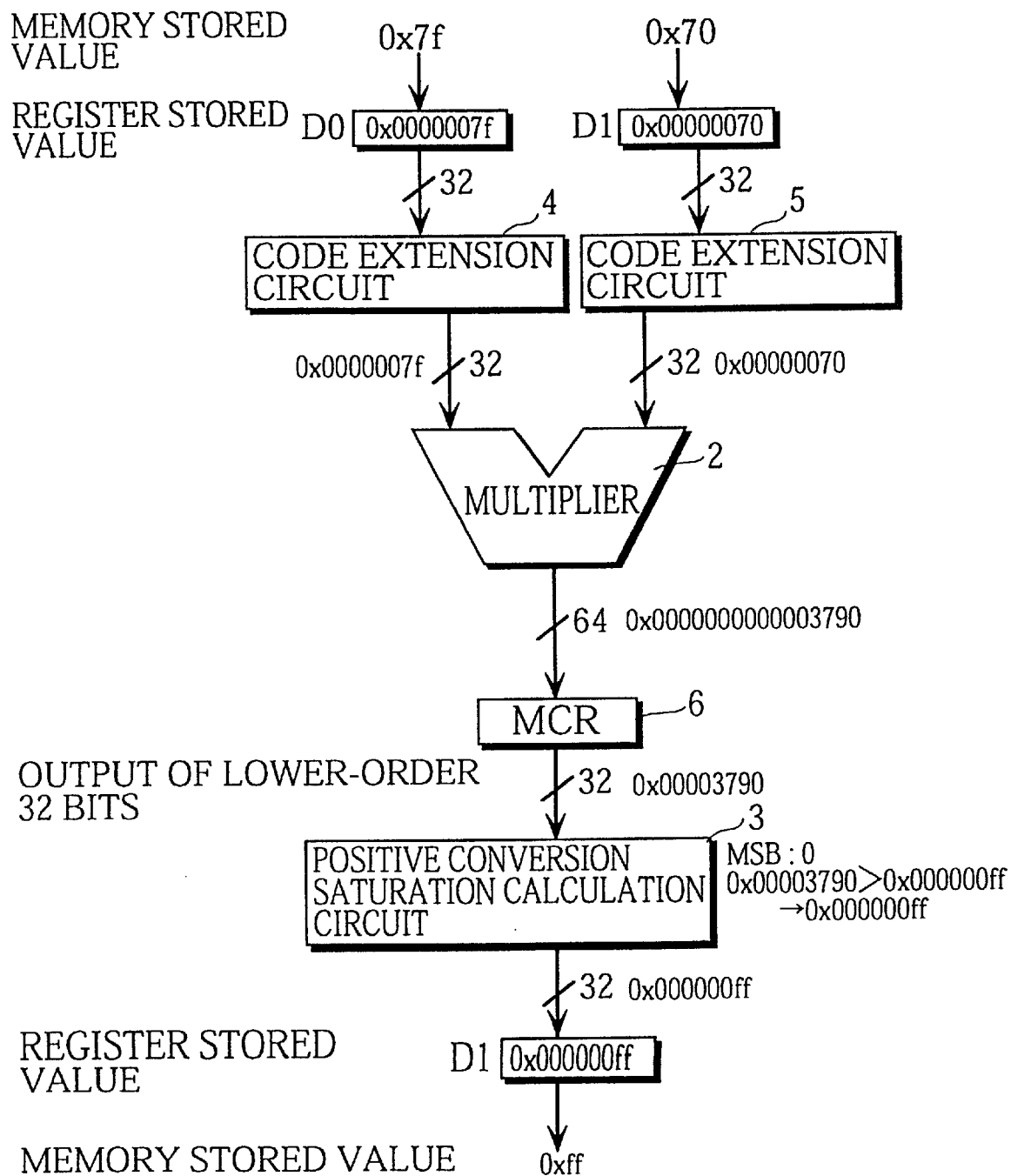
FIG. 10 shows the flow of data when performing an 8*8 bit multiplication using a 32*32 bit multiplication/sum-product unit.
Figure 11:
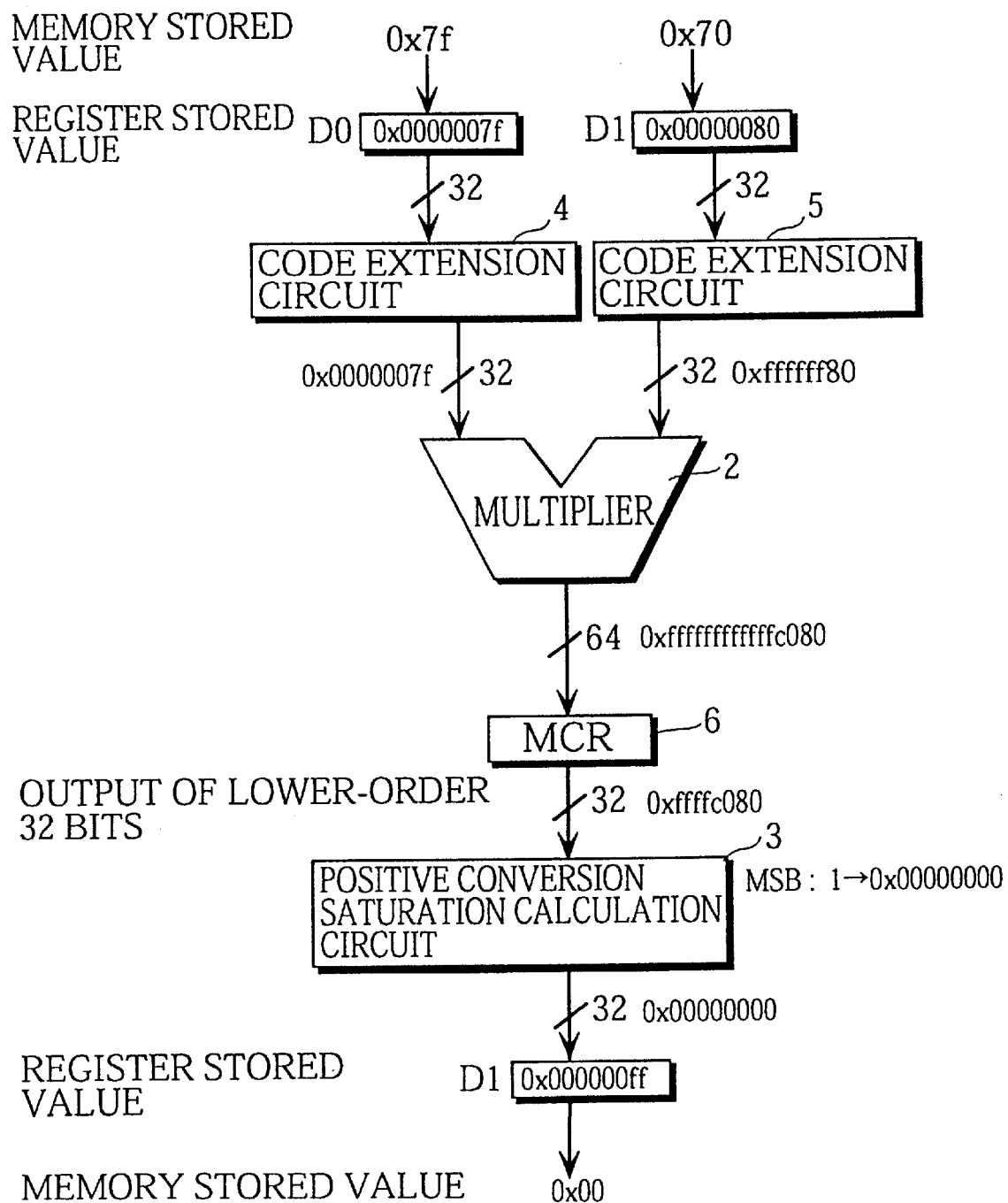
FIG. 11 shows the flow of data when performing an 8*8 bit multiplication using a 32*32bit multiplication/sum-product unit.

FIGS. 10 and 11 show the data flows in the operation execution apparatus 14. FIG. 10 shows the case when the sum-product function multiplication instruction "MACCB D0,D1" is decoded by the decoder 13, indicating the data register D0 as the multiplier and the data register D1 as the multiplicand. In this case, the stored value "0x0000_007F" of the data register D0 and the stored value "0x0000_0070" of the data register D1 stored in the register file 1 are outputted to the first internal bus 15 and to the second internal bus 16 to transfer the values to the code extension circuit 4 and the code extension circuit 5. The multiplication of the 32-bit values outputted by the code extension circuit 4 and the code extension circuit 5 is then performed by the ALU circuit 2 (since the operation performed by the ALU circuit 2 here is a multiplication, the term "multiplier" is given in FIG. 10), and the lower 325-bits "0x0000_3790" of the 64-bit value "0X0000_0000_0000_3790" that is the multiplication result are outputted to the sum-product result register 6. Since the positive conversion saturation calculation instruction "MCSST D1" is next decoded, the held value of the sum-product result register 6 is outputted to the positive conversion saturation calculation circuit 3, where the outputted value "0x0000_3790" is judged to exceed the maximum value "0x0000_00FF" for an uncoded 8-bit value, so that the maximum value "0x0000_00FF" for an uncoded 8-bit value is outputted to the data bus 18 and stored in the data register D1 in the register file 1.

In FIG. 11, the sum-product function multiplication instruction "MACCB D0,D1" which indicates the data register D0 and the data register D1 as the read addresses for the multiplier and the multiplicand has been decoded by the decoder 13. As a result, the held value "0x0000_007F" of the data register D0 and the held value "0x0000_0080" of the data register D1 stored in the register file 1 are transferred to the code extension circuit 4 and the code extension circuit 5 via the first internal bus 15 and the second internal bus 16. The held value "0x0000_0080" of the data register D1 is an 8-bit negative number, so that the code extension circuit 5 extends the eighth bit of the held value "0x0000_0080" of the data register D1 to the ninth through thirty-second bits, and so outputs the value "0xFFFF_FF80" to the ALU circuit 2.

The multiplication of the 32-bit held value "0x0000_007F" of the data register D0 outputted by the code extension circuit 4 and the 32-bit value "0xFFFF_FF80" extended by the code extension circuit 5 is performed by the code extension circuit 5, and the lower 32-bits "0xFFFF_C080" of the 64-bit multiplication result "0xFFFF_FFFF_FFFF_C080" are outputted to the sum-product result register 6. When the positive conversion saturation calculation instruction "MCSST" has been decoded, the sum-product result register 6 outputs its held value to the positive conversion saturation calculation circuit 3, which judges that the 32-bit value "0xFFFF_C080" is a coded 16-bit negative number. As a result, the positive conversion saturation calculation circuit 3 outputs the 8-bit zero value "0x0000_0000" to the data bus 18 so that this zero value is held by the data register D1 in the register file 1.

The following is a description of the operation of the processor constructed as described above. A transfer instruction included in the matrix multiplication subroutine is first written into the instruction buffer of the decoder 13 by the instruction fetch circuit 12 and the instruction "MOV(A0), D0" is decoded by the decoder 13. This instruction 5:"MOV (A0),D0" is a transfer instruction that indicates a data read for the RAM 10 using indirect register referencing that indicates the read address using the address register A0. As a result, an element on the first row and first column (F11) of the compressed data matrix Fij that is composed of 8*8 matrix elements stored in the RAM 10 is transferred to the data register D0. The following instruction, instruction 6:"MOV(A1),D0" similarly writes an element on the first row and first column (G11) of the coefficient data matrix Gji that is composed of 8*8 matrix elements into the data register D1 in the register file 1 via the data bus 18.

The next instruction in the matrix multiplication subroutine is instruction 7 which is the sum-product function multiplication instruction "MACCB D0,D1". This is fetched by the instruction fetch circuit 12 and written into the instruction buffer of the decoder 13, before being decoded by the decoder 13. When the decoder 13 decodes the sum-product function multiplication instruction "MACCB D0,D1", the held values F11 and G11 of the data register D0 and the data register D1 are transferred to the first internal bus 15 and the second internal bus 16.

When the sum-product function multiplication instruction "MACCB D0,D1" is decoded, the first internal bus 15 and the second internal bus 16 transfer the held values F11 and G11 of the read address registers indicated by the first and second operands of the sum-product function a multiplication instruction "MACCB D0,D1". These values are then outputted by the code extension circuit 4 and the code extension circuit 5 into the ALU circuit 2, where the multiplication of the held value of the data register D0 and the held value of the data register D1 is performed. The multiplication result "F11*G11" is then transferred to the sum-product result register 6 and is held by the sum-product result register 6.

Once the sum-product result register 6 has stored the multiplication result "F11*G11", a branch is performed to the label "LP1_NEXT" due to the execution of instruction 8: "CMP NUMBER,D2" and "instruction 9:"BCS LP1_NEXT", so that the instruction 13:"ADD 1,D2" is decoded.

This instruction 13:"ADD 1,D2" increments the number of iterations. After instruction 13:"ADD 1,D2", instruction 14:"ADD 1,A0" and instruction 15:"ADD ROW,A1" are executed, so that read addresses of the ROM 11 are advanced to the next column and row. As a result of the incrementing in these instructions, the read address of the compressed data is advanced to the $2^{nd}$ row, $1^{st}$ column element and the read address of the coefficient data Gji is advanced to the $1^{st}$ column, $2^{nd}$ row element.

After the read addresses have been incremented, the following instruction, instruction 16:"BRA LP1_START" is decoded. The branch address of instruction 16:"BRA LP1_START" is instruction 5:"MOV(A0),D0" which has label "LP1_START" attached, so that the branch in instruction 16 has instruction 5:"MOV(A0),D0" and instruction 6:"MOV (A1),D1" re-executed.

As a result of these transfer instructions, the $2^{nd}$ row, $1^{st}$ column element F21 in the compressed data in the RAM 10 is transferred into the data register D0, while the $1^{st}$ row, $2^{nd}$ column element G12 in the compressed data is transferred into the data register D1 in the register file 1 via the data bus 18.

In the matrix multiplication subroutine, these transfer instructions are followed by the sum-product function multiplication instruction "MACCB D0,D1", so that this sum-product function multiplication instruction "MACCB D0,D1" is written into the internal buffer of the decoder 13 by the instruction fetch circuit 12 and is decoded by the decoder 13. As a result of the decoding, the held values of the data register D0 and the data register D1 are transferred to the first internal bus 15 and the second internal bus 16.

When the sum-product function multiplication instruction "MACCB D0,D1" is decoded, the first internal bus 15 and the second internal bus 16 transfer the held values F11 and G11 of the read address registers indicated by the first and second operands of the sum-product function multiplication instruction "MACCB D0,D1". These values are the matrix elements G12 and F21, so that the multiplication of the held value G12 of the data register D0 and the held value F21 of the data register D1 is performed by the ALU circuit 2. At this point, the sum-product result register 6 holds the value "G11*F11" which is the total of the elemental operations thusfar performed in the sum-product calculation. When the sum-product function multiplication instruction "MACCB D0,D1" is decoded, the sum-product result register 6 outputs this held value onto the path P1.

Since the held value of the sum-product result register 6 is outputted onto the path P1, the multiplication result "G12*F21" of the data register D0 and the data register D1 is added to the held value of the sum-product result register 6 on the path P1. The result of the addition is then outputted onto the path P2.

Once the addition of the held value "G11*F11" and the multiplication result "G12*F21" has been performed by the ALU circuit 2, the addition result "G11*F11+G12*F21" is outputted onto the path P2, so that the sum-product result register 6 holds this addition result as the sum-product value "G11*F11+G12*F21".

The processing described above is repeated for all of the elements on the first row of the coefficient data Gji and all of the elements in the first column of the compressed data Fij, so that the sum-product value is calculated for "G11*F11+G12*F21+G13*F31+G14*F41+G15*F51+ G16*F61+G17*F71+G18*F81" and stored in the sum-product result register 6. Here, should there be a bit error during the transfer of the element 31 from the RAM 10, there is the risk that the sum-product value held by the sum-product result register 6 will be a value (such as "0x000_78FF") that clearly exceeds the range of values that can be reproduced by the reproduction-related hardware.

After this, the next loop statement in the ROM 11, the positive conversion saturation calculation instruction "MCSST D1", is written into the internal buffer of the decoder 13, this positive conversion saturation calculation instruction "MCSST D1" is decoded by the decoder 13.

When the positive conversion saturation calculation instruction "MCSST D1" is decoded by the decoder 13, the held value "0x000_78FF" of the sum-product result register 6 is outputted onto the path P1. After this value has been outputted to the P1, the comparator 22 is activated by the decoder 13. The comparator 22 compares the held value of the sum-product result register 6 with the 32-bit coded integer "0x0000_00FF" to see which is larger. Here, since the held value of the sum-product result register 6 "0x000_78FF" exceeds the 32-bit coded integer 0x0000_00FF", the comparator 22 outputs the logic value "1" to the multiplexer 24.

The polarity judging unit 23 judges whether the $16^{th}$ bit counting from the LSB side in the value held by the sum-product result register 6 is "ON". This judgement equates to a judgement as to whether the held sum-product value of the sum-product result register 6 is a negative number. The held value "0x000_78FF" expressed in binary is "0000_0000 0000_0000 0111_1000 1111_1111", so that the $16^{th}$ bit counting from the LSB side can be seen to be "0". As a result, the logic value "0" is outputted to the multiplexer 24.

In the present case, the maximum value "0x0000_00FF" and the zero value "0x0000_0000" are generated by the constant generator 21 and the zero generator 25, and the multiplexer 24 selectively outputs one of the maximum value, the zero value, and the held value of the sum-product result register 6 in accordance with the combination of the logic values outputted by the comparator 22 and the polarity judging unit 23. In the present example, the output of the comparator 22 is "1" and the output-of the polarity judging unit 23 is "0", so that the multiplexer 24 outputs the maximum value "0x0000_00FF" to the data bus 18.

According to control by the decoder 13, the selected maximum value outputted to the data bus 18 is transferred to the data register D1 that is indicated by the operand of the positive conversion saturation calculation instruction "MCSST D1", and is held by the data register D1. This held value is then written into the RAM 10 as the element H11 for the $1^{st}$ row, $1^{st}$ column of the multiplication result matrix Hij.

When the sum-product has been completed for all of the elements in the first column of the compressed data matrix Fij and the elements on the first row of the coefficient matrix Gji, the sum-product processing is performed for the elements in the second column of the compressed data matrix Fij and the elements on the first row of the coefficient matrix Gji. When the calculation of "G11*F12+G12*F22+ G13*F32+G14*F42+G15*F52+G16*F62+G17*F72+ G18*F82" has been completed, the sum-product value is held by the sum-product result register 6.

Here, if there is a bit error when transferring the element F32 from the RAM 10, the sum-product value held by the sum-product result register 6 ends up at a negative value "0x0000_86FF" that cannot be reproduced by the reproduction-related hardware.

After this, the next loop statement in the ROM 11, the positive conversion saturation calculation instruction "MCSST D1", is written into the internal buffer of the decoder 13, this positive conversion saturation calculation instruction "MCSST D1" is decoded by the decoder 13.

When the positive conversion saturation calculation instruction "MCSST D1" is decoded by the decoder 13, the held value "0x000_86FF" of the sum-product result register 6 is outputted onto the path P1. After this value has been outputted to the P1, the comparator 22 is activated by the decoder 13. The comparator 22 compares the held value of the sum-product result register 6 with the 32-bit coded integer "0x0000_00FF" to see which is larger. Here, since the held value of the sum-product result register 6 "0x000_86FF" exceeds the 32-bit coded integer "0x0000_00FF", the comparator 22 outputs the logic value "1" to the multiplexer 24.

The polarity judging unit 23 judges whether the $16^{th}$ bit counting from the LSB side in the value held by the sum-product result register 6 is "ON". This judgement equates to a judgement as to whether the held sum-product value of the sum-product result register 6 is a negative number. The held value "0x000_86FF" expressed in binary is "0000_0000 0000_0000 1000_0110 1111_1111", so that the $16^{th}$ bit counting from the LSB side can be seen to be "1". As a result, the logic value "1" is outputted to the multiplexer 24.

In the present case, the maximum value "0x0000_00FF" and the zero value "0x0000_0000" are generated by the constant generator 21 and the zero generator 25, and the multiplexer 24 selectively outputs one of the maximum value, the zero value, and the held value of the sum-product result register 6 in accordance with the combination of the logic values outputted by the comparator 22 and the polarity judging unit 23. In the present example, the output of the comparator 22 is "1" and the output of the polarity judging unit 23 is "1", so that the multiplexer 24 outputs the zero value "0x0000_0000" to the data bus 18.

According to control by the decoder 13, the selected zero value outputted to the data bus 18 is transferred to the data register D1 that is indicated by the operand of the positive conversion saturation calculation instruction "MCSST D1", and is held by the data register D1. This held value is then written into the RAM 10 as the element H12 for the $1^{st}$ row, $2^{nd}$ column of the multiplication result matrix Hij.

By repeating the above processing and writing in the remaining elements in the matrix multiplication table, the matrix multiplication table is written into the RAM 10, and by using the result of this matrix multiplication as the result of an approximation calculation of an inverse DCT, the decompression processing of compressed data can be performed.

Figure 12B:
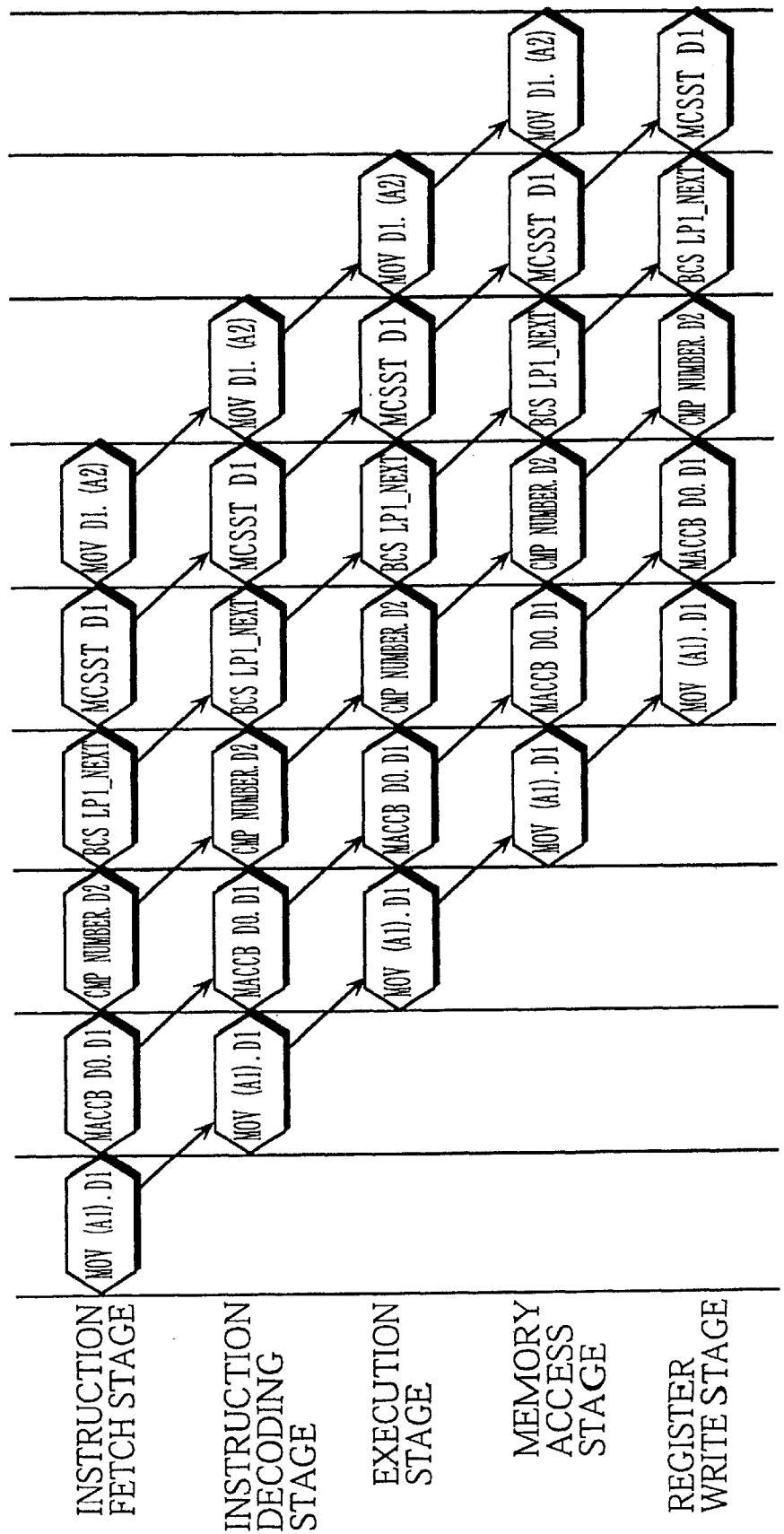
FIG. 12B shows the execution according to pipeline processing of a matrix multiplication subroutine inside the processor shown in FIG. 3.

FIG. 12B shows the execution of the matrix multiplication subroutine according to a pipeline process composed of five stages which namely are an instruction fetch stage, an instruction decoding stage, an execution stage, a memory access stage, and a register write stage. When instruction 10:"MCSST D1" is fetched by the decoder 13, the preceding instruction 9:"BCS LP1_NEXT" will be in the decode stage. Since in instruction 8:"CMP NUMBER,D2" a calculation is performed to subtract the total iteration number "NUMBER" from the number of iterations held by the data register D2, if the carry flag is set at "ON" as a result of the subtraction, a branch is performed to instruction 13:"ADD 1,D2" so that the execution stage of instruction 10:"MCSST D1" is stopped.

On the other hand, when the carry flag is set at "OFF", the decoding stage of instruction 10:"MCSST D1" is performed at the same time as the execution stage of instruction 9:"BCS LP1_NEXT". After this, the execution stage of instruction 10:"MCSST D1" is performed at the same time as the memory access stage of instruction 9:"BCS LP1_NEXT". The positive conversion saturation calculation processing for the matrix multiplication result of one row of elements by one column of elements is performed when the instruction located before it is in the memory access stage, so that the processing can be seen to be performed without confusion in the pipeline.

In this way, even if the processor provided in the positive conversion saturation calculation circuit 3 needs to perform the matrix multiplication of one row of elements and one column of elements with a very high frequency, the positive conversion saturation calculation processing is expressed in the machine language program as a single instruction, so that there is no confusion in the pipeline. As a result, the processor can operate at high speed.

With the present embodiment described above, the positive conversion saturation calculation processing of sum-product values is performed by subjecting the sum-product value accumulated in the sum-product result register 6 to positive conversion saturation calculation processing, so that application programs for matrix approximation calculations required by decompression processing of video data and audio data can be easily coded using a remarkably small code size. Since there is a large reduction in code size, a large reduction-can be made in the amount of ROM that needs to be installed to store the program.

The positive conversion saturation calculation processing for the sum-product value is such that the positive correction processing and the saturation calculation processing are performed at the same time for the held value of the sum-product result register 6, so that the processing is performed at high speed. The positive conversion saturation calculation processing needs to be performed every time one row of elements is multiplied by one column of elements so that when 8 rows are multiplied by 8 rows, 64 executions of the positive conversion saturation calculation processing are necessary. However, since the positive correction processing and the saturation calculation processing are performed smoothly, each execution of the positive conversion saturation calculation processing is completed in a very short time. If the positive conversion saturation calculation processing is completed in a short time, the decompression processing for image data and audio data that require the matrix multiplication of a large amount of data can be performed at high speed.

Since the positive conversion saturation calculation processing performed by the positive conversion saturation calculation circuit 3 does not include branch instructions, the processor can perform high-speed pipeline processing without the risk of confusion in the pipeline. By executing such a high-performance pipeline, matrix multiplication can be performed at an improved speed.

Since positive conversion saturation calculation processing is performed without installing a specialized circuit for matrix multiplication, there is no loss in versatility for the processor. Accordingly, should a user wish to control the processor according to an original decompression processing program, this is still possible.

Applied Example for the First Embodiment

Figure 13:
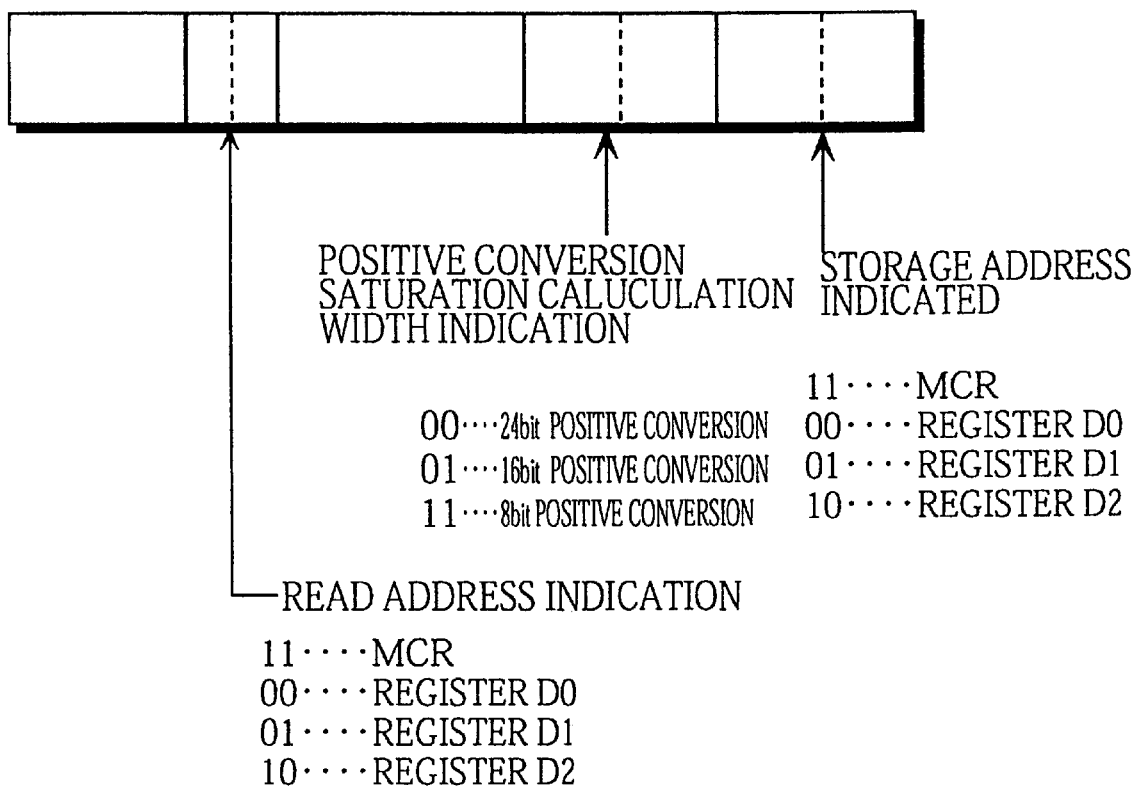
FIG. 13 shows the instruction format of a positive conversion saturation calculation instruction "MCSST" in the applied example in the first embodiment.

In this example, one of the data registers D0 to D2 is indicated as the read address for the positive conversion saturation calculation processing according to the positive conversion saturation calculation instruction "MCSST", with the sum-product result register 6 being indicated as the storage address for the calculation. In this example, the instruction format of the positive conversion saturation calculation instruction "MCSST" is shown in FIG. 13. As shown in FIG. 13, the positive conversion saturation calculation instruction "MCSST" has a read address indication field which can be set a value which is one of "11", "00", "10", and "01", thereby indicating the sum-product result register 6, the data register D0, the data register D1, or the data register D2.

By writing one of "11", "00", "10", and "01" into the storage address indication field, one of the sum-product result register 6, the data register D0, the data register D1, and the data register D2 can be indicated as the storage address.

Figure 14:
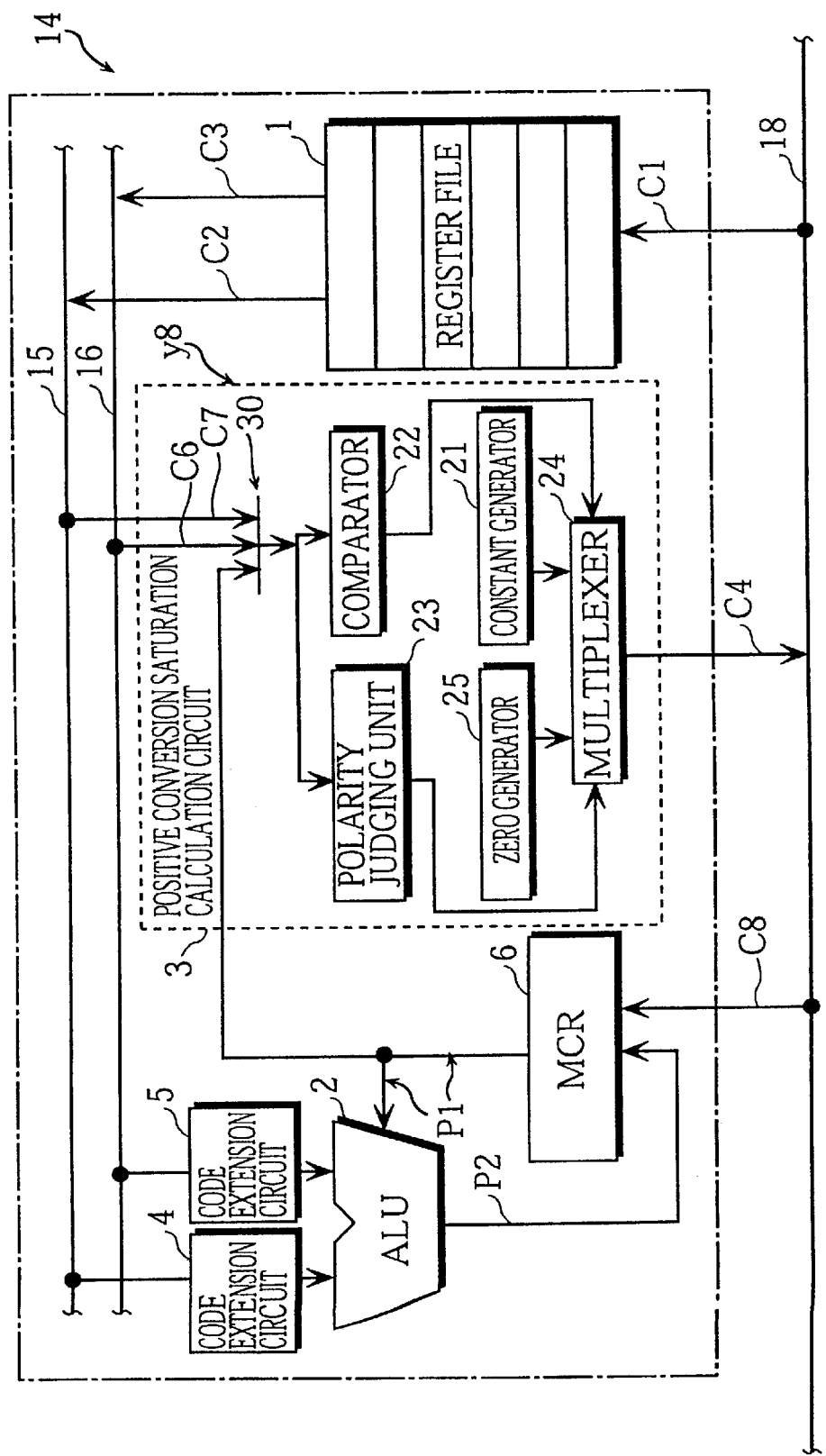
FIG. 14 shows the internal construction of the operation execution apparatus 14 in the first embodiment.

The instruction format of this positive conversion saturation calculation instruction "MCSST" has been amended so the internal construction of the operation execution apparatus 14 shown in FIG. 4 is also slightly changed, as shown in FIG. 14. The changes in the operation execution apparatus 14 shown in FIG. 14 are the addition of the paths C6 to C8 and the selector 30.

The path C6 is a path for transferring the held value of the data register D0, the data register D1, or the data register D2 on the second internal bus 16 to the positive conversion saturation calculation circuit 3.

In the same way, the path C7 is a path for transferring the held value of the data register D0, the data register D1, or the data register D2 on the first internal bus 15 to the positive conversion saturation calculation circuit 3.

The selector 30 outputs one of the held value of the data register D0, the data register D1, or the data register D2 transferred on the path C6 or C7, or the held value of the sum-product result register 6 to the comparator 22 in the positive conversion saturation calculation circuit 3 based on an indication of the storage address field in the positive conversion saturation calculation instruction "MCSST".

The path C8 is a path for transferring the processing result of the positive conversion saturation calculation circuit 3 from the data bus 18, to which it has been transferred from the positive conversion saturation calculation circuit 3 via the path C4, to the sum-product result register 6.

By making the simple addition described above, the functioning of the positive conversion saturation calculation instruction "MCSST" can be extended in the present embodiment.

Second Embodiment

Figure 15:
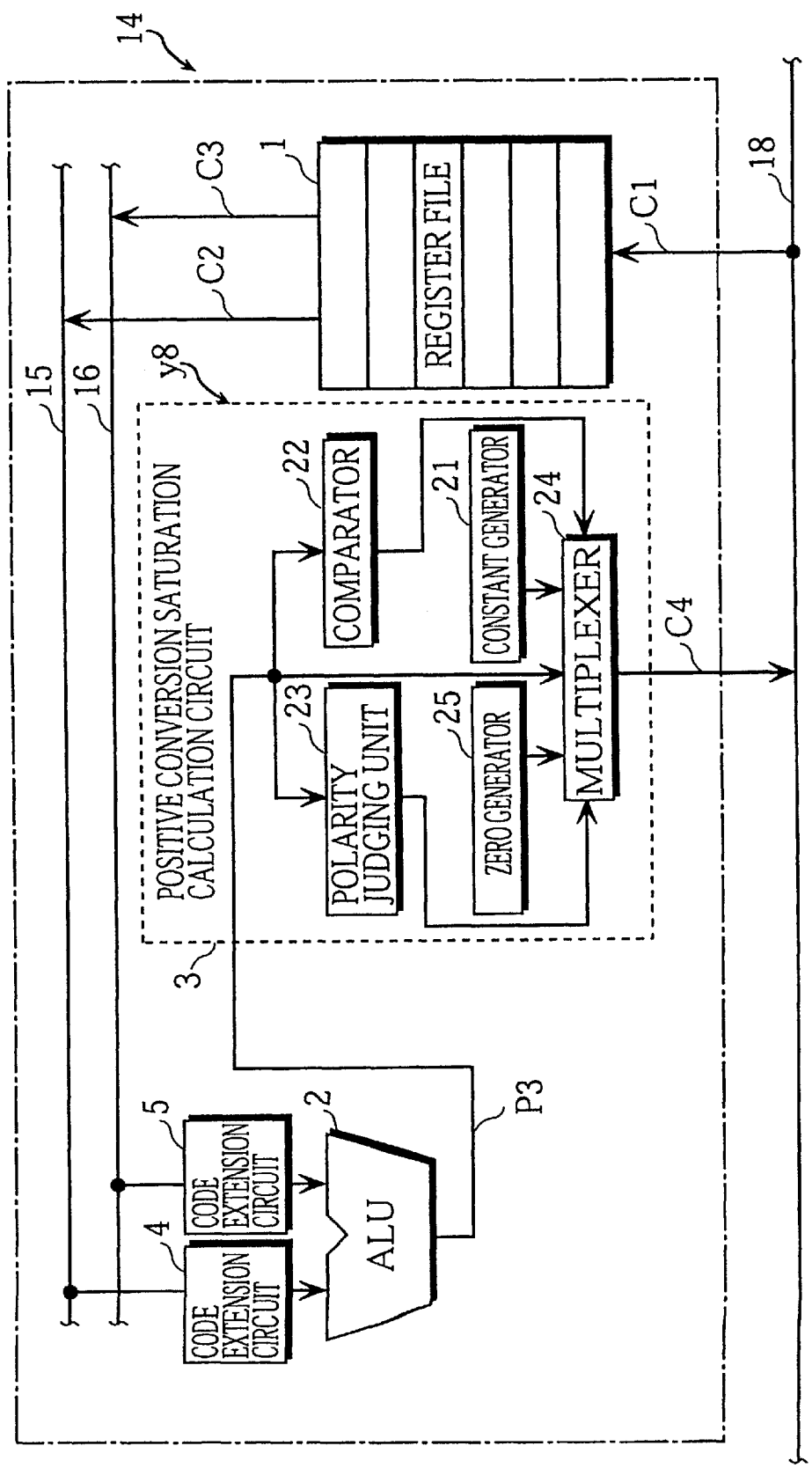
FIG. 15 shows the internal construction of the operation execution apparatus 14 in the second embodiment.

The second embodiment of the present invention executes positive conversion saturation calculation processing for a multiplication result when multiplication is performed by the ALU circuit 2. To perform positive conversion saturation calculation processing for a multiplication result, the second embodiment is constructed as shown in FIG. 15, so that the positive conversion saturation calculation circuit 3 is connected via the path P3 to the output stage of the ALU circuit 2 to enable the positive conversion saturation calculation circuit 3 to perform positive conversion saturation calculation processing on the multiplication results outputted by the ALU circuit 2. In order to activate the positive conversion saturation calculation circuit 3, the decompression processing program stored in the ROM 11 of the present embodiment also includes the "MULBSST Dm,Dn" instruction described below.

A "MULBSST Dm,Dn" instruction is a multiplication instruction that indicates that the multiplication result should be further subjected to positive conversion saturation calculation processing. In other words, multiplication is performed using the lower 8 bits of the Dm register and the Dn register, and the positive conversion saturation calculation circuit 3 is then instructed to perform positive conversion saturation calculation processing on the coded 16-bit multiplication result.

Figure 16:
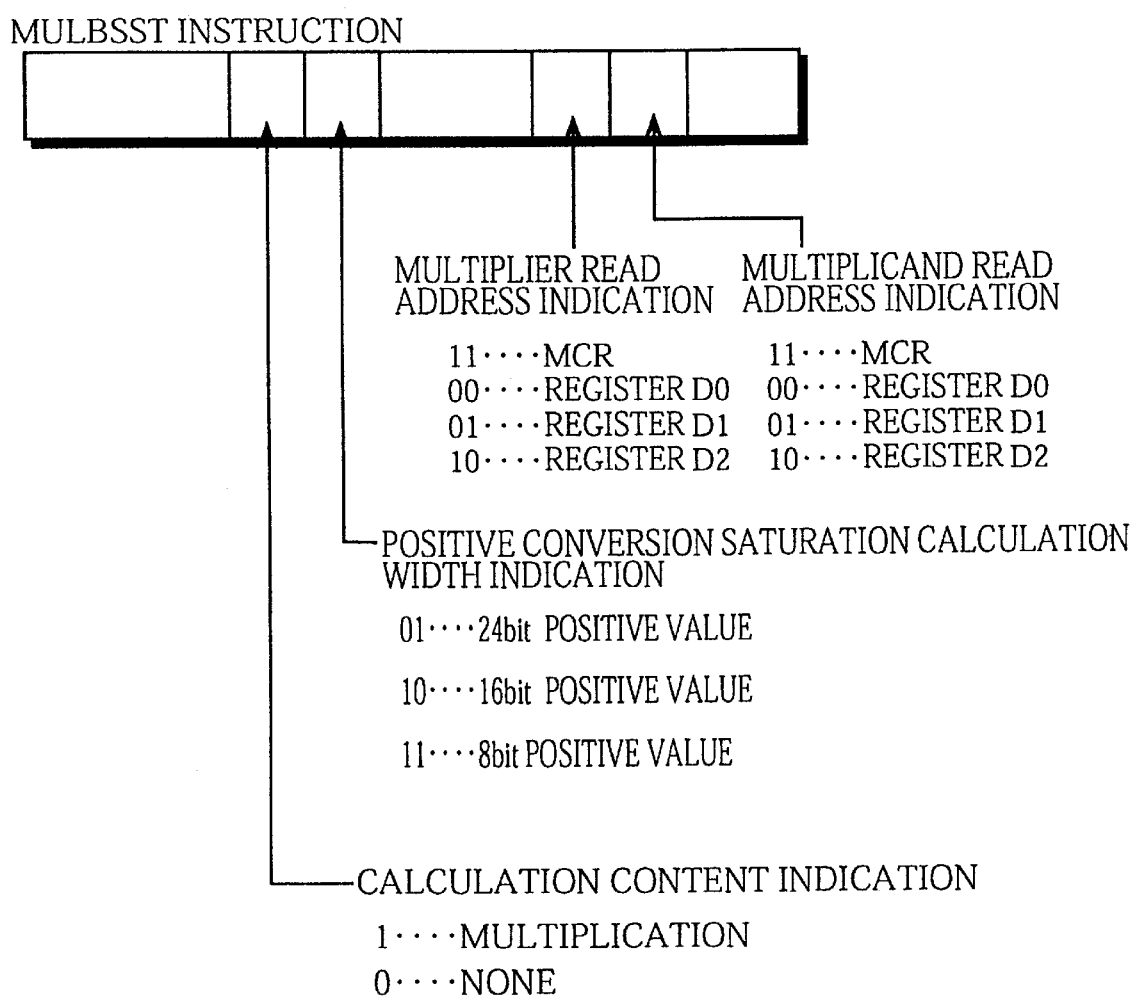
FIG. 16 shows the instruction format of a positive conversion saturation calculation multiplication instruction "MulBSST Dm,Dn".

FIG. 16 shows the instruction format of the positive conversion saturation calculation function multiplication instruction "MULBSST Dm,Dn". As shown in FIG. 16, this positive conversion saturation calculation function multiplication instruction "MULBSST Dm,Dn" includes a 1-bit field indicating the calculation content of an elemental operation, a 2-bit field indicating the read address of the multiplier, a 2-bit field indicating the read address of the multiplicand, and a 2-bit field indicating the storage address for the result of the positive conversion saturation calculation processing.

By writing one of "01", "10", and "11" into the positive conversion saturation calculation processing field, it is possible to specify that the positive conversion saturation calculation processing with a rounding width of a 24-bit positive number, a 16-bit positive number, or an 8-bit positive number.

By writing one of "00", "01", "10", and "11" into the multiplier read address indicating field and the multiplicand read address indicating field, any of the data register D0, the data register D1, the data register D2, and the sum-product result register 6 can be indicated as the read address register for the multiplier Fij and the multiplicand Gji.

When executing the positive conversion saturation calculation function multiplication instruction "MULBSST Dm,Dn", the register file 1 outputs the held values of the registers with the register names indicated by the first and second operands. The ALU circuit 2 then multiplies the values of registers Dm and Dn and outputs the multiplication result. The same positive conversion saturation calculation processing as in the first embodiment is then performed on the multiplication result by the positive conversion saturation calculation circuit 3, and the result of the positive conversion saturation calculation processing is stored in the register indicated by the second operand of the positive conversion saturation calculation function multiplication instruction.

The following is an explanation of the operation of the above processor based on a matrix multiplication subroutine. First, a transfer instruction included in the matrix multiplication subroutine is written into the instruction buffer of the decoder 13 by the instruction fetch circuit 12, and the fetched transfer instruction is decoded by the decoder 13. As a result, the first row, first column element (F11) of the compressed data Fij which is composed of 8*8 matrix elements stored in the RAM 10 is transferred in the data register D0 and the first row, first column element (G11) of the coefficient data Gji which is also composed of 8*8 matrix elements is transferred into the data register D1.

In the matrix multiplication subroutine, the positive conversion saturation calculation function multiplication instruction "MULBSST D0,D1" follows the transfer instruction, so that this instruction is next fetched by the instruction fetch circuit 12 and written into the instruction buffer of the decoder 13, before being decoded by the decoder 13. When the decoder 13 decodes the positive conversion saturation calculation function multiplication instruction "MULBSST D0,D1", the values F11 and G11 held by the data register D0 and the data register D1 are transferred to the first internal bus 15 and the second internal bus 16.

When the positive conversion saturation calculation function multiplication instruction "MULBSST D0,D1" is decoded, the held values F11, G11 of the read address instructions indicated by the first and second operands of the positive conversion saturation calculation function multiplication instruction "MULBSST D0,D1" are transferred onto the first internal bus 15 and the second internal bus 16, so that held value of the data register D0 and the held value of the data register D1 are multiplied by the ALU circuit 2, with the multiplication result being outputted onto the path P1. Here, however, a bit error occurs for F11, so that the multiplication result becomes "0x0000_78FF", which is a value that cannot be expressed using one byte.

When the decoder 13 has decoded the positive conversion saturation calculation function multiplication instruction "MULBSST D0,D1", the decoder 13 also activates the positive conversion saturation calculation circuit 3. As a result, the comparator 22 compares the magnitude of the held value of the sum-product result register 6 with the 32-bit coded integer "0x0000_00FF". Here, since the held value of the sum-product result register 6 exceeds the maximum value "0x0000_00FF" for the held value of the sum-product result register 6, the comparator 22 outputs the logic value "1" to the multiplexer 24.

The polarity judging unit 23 judges whether the sixteenth bit of the value held by the sum-product result register 6 is "ON". This refers to a judgement as to whether the value held by the sum-product result register 6 is a negative number. When expressed in binary, the held number "0x0000_78FF" is "0000_0000 0000_0000 0111_1000 1111_1111", so that the sixteenth bit can be seen to be "1". As a result, the polarity judging unit 23 outputs the logic value "0" to the multiplexer 24.

In the present case, the constant generator 21 generates the maximum value "0x0000_00FF" and the zero generator 25 generates the zero value "0x0000_0000". The multiplexer 24 selects and outputs one of the maximum value, the zero value, and the held value of the sum-product result register 6 in accordance with the combination of the logic values outputted by the comparator 22 and the polarity judging unit 23. In the present example, the output of the comparator 22 is "1" and the output of the polarity judging unit 23 is "0", so that the multiplexer 24 outputs the maximum value "0x0000_00FF" generated by the constant generator 21 to the data bus 18.

According to control by the decoder 13, the value outputted to the data bus 18 is transferred to the data register D0 indicated by the operand of the positive conversion saturation calculation instruction "MULBSST D0", and is held by the data register D0.

By means of the second embodiment described above, a calculation instruction that performs saturation calculation processing and positive conversion processing on the coded calculation result is provided, so that three types of processing composed of calculation processing, positive conversion processing, and saturation calculation processing can be performed in one step, meaning that positive conversion saturation calculation processing is performed in the same step as the calculation processing. As a result, the effective number of execution steps required by positive conversion saturation calculation processing is reduced to zero.

It should be noted here that this second embodiment has been described as performing a rounding process for an uncoded 8-bit width, although the maximum number can be freely set at any positive integer.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor that decodes and executes instructions, the processor comprising:
   a detecting unit for detecting whether an instruction to be decoded is a predetermined instruction; and
   a rounding unit for rounding, when the detecting unit is detecting that the instruction is the predetermined instruction, a signed m-bit integer stored at an operand designated by the predetermined instruction to a value expressed as an unsigned s-bit integer wherein s is less than m.

2. The processor of claim 1, wherein the predetermined instruction includes a transfer address of a value rounded by the rounding unit, and the rounding unit includes:
   a first judging circuit for judging, when the detecting unit is detecting that the instruction is the predetermined instruction, whether a signed m-bit integer stored at the operand is a negative number; and
   a second judging circuit for judging when the detecting unit is detecting that the instruction is the predetermined instruction, whether a signed m-bit integer stored at the operand exceeds a maximum value expressed as an unsigned s-bit integer, and
   wherein the processor further comprises:
   transferring unit for transferring one of a first predetermined value expressed as an unsigned s-bit integer a second predetermined value expressed as an unsigned s-bit integer, and a value stored at the operand to the transfer address for a rounding result, based on the combination of respective judging results of the first judging circuit and the second judging circuit.

3. The processor of claim 2,
   wherein the transferring unit transfers a value zero expressed as an s-bit integer as the first predetermined value to the transfer address for the rounding result, when the first judging circuit judges that the signed m-bit integer stored at the operand is a negative number;
   wherein the transferring unit transfers the maximum value expressed as an unsigned s-bit integer as a second predetermined value to the transfer address for the rounding result, when the second judging circuit judges that the signed m-bit integer stored at the operand exceeds the maximum value expressed as an unsigned s-bit integer, and
   wherein the transferring unit transfers the value stored at the operand to the transfer address for the rounding result, when the first judging circuit judges that the signed m-bit integer stored at the operand is not a negative number and the second judging circuit judges that the signed m-bit integer stored at the operand does not exceed the maximum value.

4. The processor of claim 3,
   wherein the first judging circuit includes a judging unit for judging whether a sign bit of an s-bit integer in the signed m-bit integer stored at the operand is on or off, and
   wherein the second judging circuit includes a calculator for subtracting a maximum positive value for an s-bit integer from the signed m-bit integer stored at the operand.

5. The processor of claim 4, wherein m-bit is 32 bits in size and the predetermined instruction includes an indication field indicating one of 8 bits, 16 bits, and 24 bits as s-bit,
   wherein the judging unit of the first judging circuit examines one of an eighth, sixteenth, and twenty-fourth bit counted from a least significant bit side as the sign bit, in accordance with a content of the indication field included in the predetermined instruction, and wherein the second judging circuit includes a generating unit for generating one of an unsigned 8-bit integer, and an unsigned 16-bit integer, and an unsigned 24-bit integer, in accordance with a content of the indication field included in the predetermined instruction.

6. The processor of claim 2, further comprising a specialized register and a calculation unit for performing a calculation in the instruction sequence and adding a calculation result to a value held by the specialized register, wherein the predetermined instruction designates the specialized register as the operand, and the transferring unit transfers the value stored in the specialized register to the transfer address for the rounding result, when the first judging circuit judges that a signed m-bit integer stored in the specialized register is not a negative number and the second judging circuit judges that the signed m-bit integer stored in the specialized register does not exceed the maximum value.

7. The processor of claim 6, further comprising a register file composed of a plurality of general registers, wherein the predetermined instruction designates one of the general registers in the register file as a transfer address for a rounding result, and wherein the transferring unit transfers one of a first predetermined value express as an unsigned s-bit integer, a second predetermined value expressed as an unsigned s-bit integer, and a value stored in the specialized register to the general register being designated by the predetermined instruction.

8. A processor that decodes and executes instructions, the processor comprising:

first detecting unit for detecting whether an instruction to be decoded is an instruction performing a calculation;

second detecting unit for detecting whether an instruction to be decoded is an instruction performing both a calculation and a rounding of the calculation result;

calculating unit for performing, when the first detecting unit detects that the instruction performs a calculation, a calculation using a signed m-bit integer; and rounding unit for rounding, when the second detecting unit detects the instruction performing both a calculation and a rounding, a result of the calculation performed with a signed m-bit integer to a value expressed as an unsigned s-bit integer wherein s is less than m.

9. The processor of claim 8, wherein the instruction performing both a calculation and a rounding further includes an indication of a transfer address for a rounding result, and wherein the rounding unit includes:

a first judging circuit for judging, when the second detecting unit detects the instruction performing both a calculation and a rounding, whether the calculation result of the calculating unit is a negative number; and a second judging circuit for judging, when the second detecting unit detects that the instruction performing both a calculation and a rounding, whether the calculation result of the calculating unit exceeds a maximum value expressed as an unsigned s-bit integer, and wherein the processor further comprises:

transferring unit for transferring one of a first predetermined value expressed as an unsigned s-bit integer, a second predetermined value expressed as an unsigned s-bit integer, and the calculation result of the calculating unit to the transfer address, based on the combination of respective judging results of the first judging circuit and the second judging circuit.

10. The processor of claim 9, wherein the transferring unit transfers a value zero expressed as an s-bit integer as the first predetermined value to the transfer address, when the first judging circuits judges that the calculation result of the calculating unit is a negative number;

wherein the transferring unit transfers the maximum value expressed as an unsigned s-bit integer as the second predetermined value to the transfer address, when the second judging circuit judges that the calculation result of the calculating unit exceeds the maximum value expressed as an unsigned s-bit integer; and wherein the transferring unit transfers the calculation result of the calculating unit to the transfer address for the rounding result, when the first judging circuit judges that the calculation result of the calculating unit is not a negative number and the second judging circuit judges that the calculation result of the calculating unit does not exceed the maximum value.

11. The processor of claim 10, wherein the first judging circuit includes a judging unit for judging whether a sign bit of the calculation result of the calculating unit is on or off, and wherein the second judging circuit includes a calculator for subtracting a maximum positive value for an unsigned s-bit integer from the calculation result of the calculation unit.

12. The processor of claim 11, wherein m bits is 32 bits in size and the correction instruction includes an indication field indicating one of 8 bits, 16 bits, and 24 bits as s bits, wherein the judging unit of the first judging circuit examines one of an eighth, sixteenth, and twenty-fourth bit from a least significant bit as the sign bit, in accordance with a content of the indication field included in the correction instruction, and wherein the calculator includes a generating unit for generating one of an unsigned 8-bit integer, an unsigned 16-bit integer, and an unsigned 24-bit integer, in accordance with a content of the indication field included in a correction instruction.

13. The processor of claim 12, further comprising a register file composed of a plurality of general registers, wherein each calculation instruction designates one of the general registers in the register file as a transfer address for a rounding result.

14. A machine readable medium storing a program that enables a processor for executing a rounding process comprising:

detection step for directing the processor for detecting whether an instruction to be decoded by the processor is a predetermined instruction; and rounding step for directing the processor for rounding a signed m-bit integer stored at an operand designated by the predetermined instruction to a value expressed as an unsigned s-bit integer wherein s is less than m.

15. A program recording medium that enables a processor to decode and execute instructions comprising:

first direction for directing the processor to detect whether an instruction to be decoded is an instruction for performing a calculation;

second direction for directing the processor to detect whether an instruction to be decoded is an instruction performing both a calculation and a rounding of the calculation result;

third direction for directing the processor to perform, when the processor detects that the instruction performs a calculation, a calculation using a signed m-bit integer; and fourth direction for directing the processor, when the processor is detecting an instruction performing both a calculation and a rounding, for rounding a result of the calculation performed with a signed m-bit integer to a value expressed as an unsigned s-bit integer wherein s is less than m.

16. The program recording medium of claim 15 further including fifth direction for directing the processor to designate a register as a transfer address for a rounding result.

17. The program recording medium of claim 16 wherein the fourth direction includes:

a first judging step for judging, when the processor detects the instruction performing both a calculation and a rounding, whether the calculation result of the calculating means is a negative number; and a second judging step for judging, when the processor detects that the instruction performing both a calculation and a rounding, whether the calculation result of the calculating means exceeds a maximum value expressed as an unsigned s-bit integer, and transferring step for directing the processor to transfer one of a first predetermined value expressed as an unsigned s-bit integer, a second predetermined value expressed as an unsigned s-bit integer, and the calculation result of the calculating data to the transfer address, based on the combination of respective judging results of the first judging step and the second judging step.

18. The program recording medium of claim 17 wherein the transferring step directs the processor to transfer a value zero expressed as an s-bit integer as the first predetermined value to the transfer address, when the first judging data judges that the calculation result of the calculating data is a negative number, wherein the transferring step directs the processor to transfer the maximum value expressed as an unsigned s-bit integer as the second predetermined value to the transfer address, when the second judging step judges that the calculation result of the calculating data exceeds the maximum value expressed as an unsigned s-bit integer; and wherein the transferring step directs the processor to transfer the calculation result of the calculating data to the transfer address for the rounding result, when the first judging step judges that the calculation result of the calculating data is not a negative number and the second judging step judges that the calculation result of the calculating data does not exceed the maximum value.

19. The processor of claim 18, wherein the first judging step directs the processor to determine whether a sign bit of the calculation result of the calculating data is on or off, and wherein the second judging step directs the processor to subtract a maximum positive value for an unsigned s-bit integer from the calculation result of the calculation data.

20. The program recording medium of claim 19, wherein m-bit is 32 bits in size and the fourth direction includes an indication field indicating one of 8 bits, and 24 bits as s bits, wherein the first judging step directs the processor to examine one of an eighth, sixteenth, and twenty-fourth bit from a least significant bit as the sign bit, in accordance with a content of the indication field, wherein the second judging step directs the processor to generate one of an unsigned 8-bit integer, an unsigned 16-bit integer, and an unsigned 24-bit integer, in accordance with a content of the indication field.

* * * * *